(12) United States Patent
Edwards et al.

(10) Patent No.: US 12,042,008 B2
(45) Date of Patent: Jul. 23, 2024

(54) LASER ETCHED ARTICLE OF FOOTWEAR AND RELATED METHOD

(71) Applicant: NIKE, Inc., Beaverton, OR (US)

(72) Inventors: Charles R. Edwards, Portland, OR (US); Jeremy Gantz, Lake Oswego, OR (US); Dervin A. James, Hillsboro, OR (US); Honam Ko, Geumjeong-gu (KR); Adam Kohn, Beaverton, OR (US); Harry Lam Pham, Beaverton, OR (US); Eric S. Schindler, Beaverton, OR (US); Yuanmin Wang, Portland, OR (US)

(73) Assignee: NIKE, Inc., Beaverton, OR (US)

(*) Notice: Subject to any disclaimer, the term of this patent is extended or adjusted under 35 U.S.C. 154(b) by 161 days.

(21) Appl. No.: 17/531,169

(22) Filed: Nov. 19, 2021

(65) Prior Publication Data

US 2022/0160076 A1 May 26, 2022

Related U.S. Application Data

(60) Provisional application No. 63/116,448, filed on Nov. 20, 2020.

(51) Int. Cl.
| | |
|---|---|
| *A43B 13/20* | (2006.01) |
| *A43D 8/16* | (2006.01) |
| *B23K 26/352* | (2014.01) |
| *B29C 65/00* | (2006.01) |
| *B29C 43/36* | (2006.01) |
| *B29D 35/12* | (2010.01) |

(52) U.S. Cl.
CPC ............... *A43B 13/20* (2013.01); *A43D 8/16* (2013.01); *B23K 26/352* (2015.10); *B29C 66/0346* (2013.01); *B29C 2043/3649* (2013.01); *B29D 35/122* (2013.01)

(58) Field of Classification Search
CPC ........ A43B 13/20; A43D 8/16; B29D 35/122; B32B 2437/02
See application file for complete search history.

(56) References Cited

U.S. PATENT DOCUMENTS

2018/0235315 A1* 8/2018 Hensley ................ A43B 13/20

FOREIGN PATENT DOCUMENTS

| CN | 101863394 A | 10/2010 |
|---|---|---|
| WO | WO-2016164551 A1 | 10/2016 |

OTHER PUBLICATIONS

European Patent Office (ISA), International Search Report and Written Opinion for PCT App. No. PCT/US2021/060227, mailed Mar. 4, 2022.

* cited by examiner

*Primary Examiner* — Gregory Listvoyb
(74) *Attorney, Agent, or Firm* — Honigman LLP; Matthew H. Szalach; Jonathan P. O'Brien

(57) ABSTRACT

A bladder includes a first polymeric film, a second polymeric film attached to the first polymeric film to form a chamber, and one or more grooves formed in an exterior surface of the chamber. In one configuration, the grooves are formed in the exterior surface of the chamber by subjecting the chamber to a laser-etching process.

10 Claims, 18 Drawing Sheets

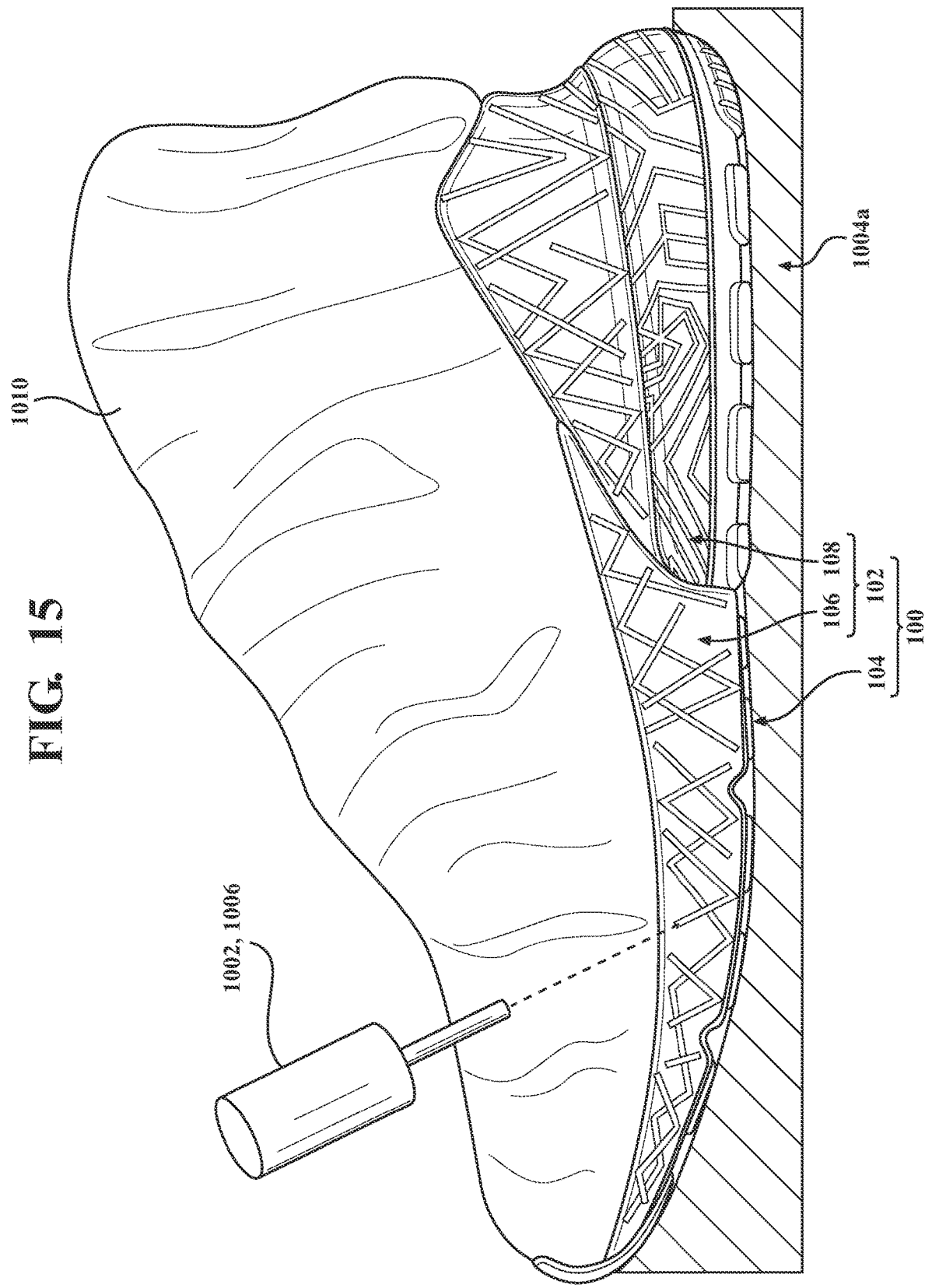

LASER ETCHED ARTICLE OF FOOTWEAR AND RELATED METHOD

CROSS REFERENCE TO RELATED APPLICATIONS

This application claims priority under 35 U.S.C. § 119(e) to U.S. Provisional Application No. 63/116,448, filed on Nov. 20, 2020. The disclosure of this prior application is considered part of the disclosure of this application and is hereby incorporated by reference in its entirety.

FIELD

The present disclosure relates to a laser etched article of footwear and a related system and method for laser etching an article of footwear.

BACKGROUND

This section provides background information related to the present disclosure and is not necessarily prior art.

Bladders or airbags are used in articles of footwear and apparel to provide cushioning and other performance characteristics during use. Such bladders typically include one or more polymeric films forming an outer layer of the bladder and defining an interior chamber that contains a compressible material, such as a fluid, an elastomeric material, and/or a tensile structure. The fluid and/or elastomeric material provide the bladder with the ability to absorb and cushion forces applied thereto while the tensile member helps maintain a desired shape of the bladder in a relaxed state.

In articles of footwear, bladders are traditionally concealed within a sole structure of the article of footwear to provide cushioning and responsiveness to a wearer during use. Such bladders may be contained within a midsole of the article of footwear and, as a result, are hidden from view. Alternatively, a midsole may include one or more openings where the bladder is visible at a sidewall of the sole structure. Such openings may be so large, in fact, that the bladder forms a majority of a thickness of the sole structure. In such a configuration, a sidewall of the bladder may extend between and join an upper of the article of footwear and a ground-contacting surface of the article of footwear.

Regardless of the particular structure of the bladder and its relationship to other components of the sole structure, the shape, color, and overall appearance of the bladder and other components of the sole structure are typically designed to complement the surrounding structure of the article of footwear to provide the article of footwear with a desired appearance.

DRAWINGS

The drawings described herein are for illustrative purposes only of selected configurations and not all possible implementations, and are not intended to limit the scope of the present disclosure.

FIG. 15 shows an operation of an example method for laser etching articles of footwear using a system in accordance with the present disclosure.

Corresponding reference numerals indicate corresponding parts throughout the drawings.

DETAILED DESCRIPTION

Figure 1A:
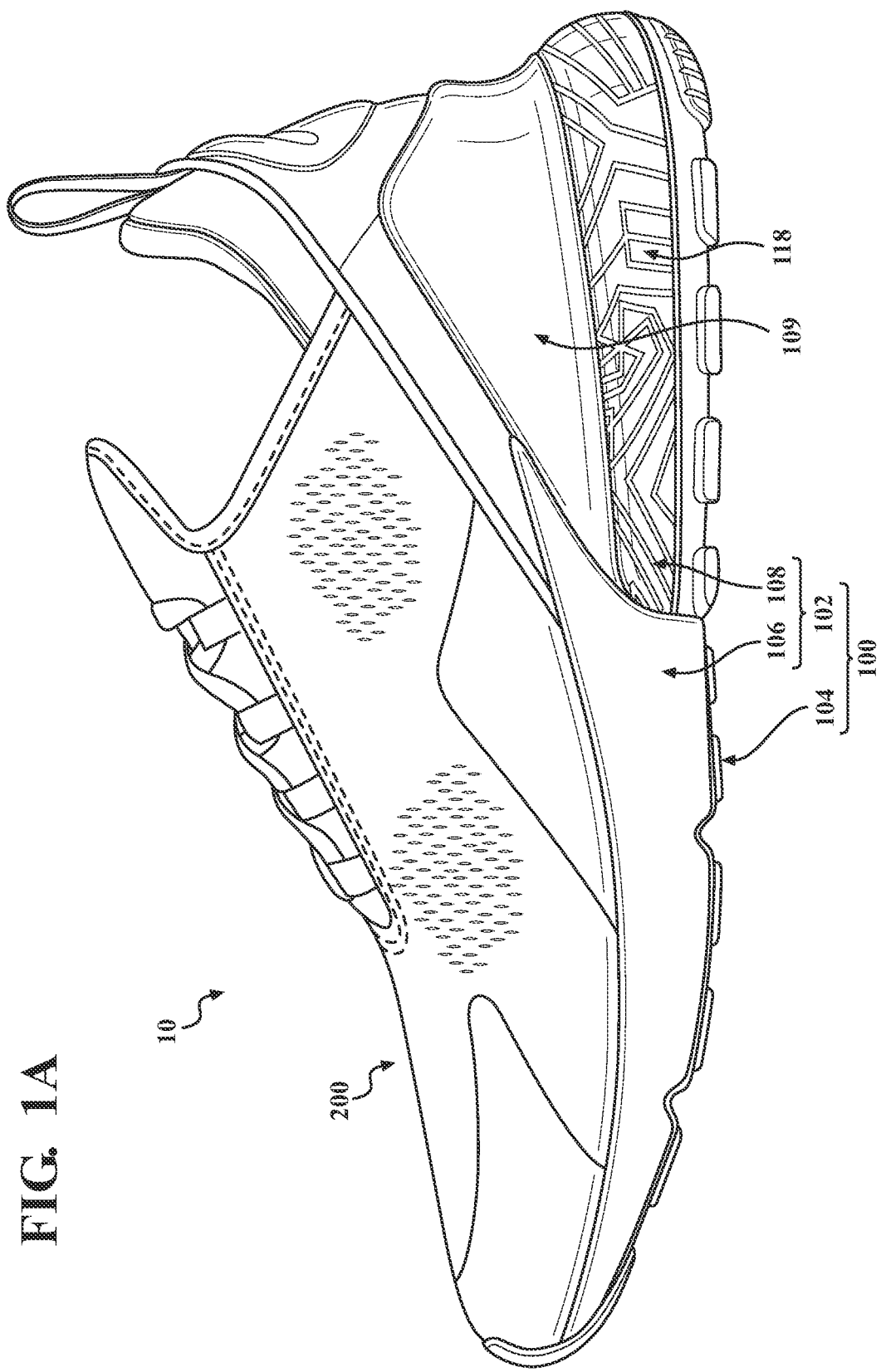
FIG. 1A shows an article of footwear including an example of a bladder manufactured using a laser etching process in accordance with the principles of the present disclosure.

The present disclosure is directed to bladders, sole structures for articles of footwear including bladders, articles of footwear including bladders, methods of manufacturing bladders, bladders manufactured using the methods, sole structures manufactured using the methods, and articles of footwear manufactured using the methods. The bladder includes a first polymeric film and a second polymeric film joined together with each other to form a chamber, which may be provided with a compressible material such as a fluid or an elastomeric material. An exterior surface of the chamber includes one or more grooves formed by subjecting the exterior surface of the chamber to a laser. Depths of the one or more grooves range from 5% to 35% of an entire thickness of an exterior layer of the chamber defined by the polymeric films. Optionally, the exterior surface of the chamber may include a coloring substance. Here, depths of the one or more grooves extend through a thickness of the coloring substance and into the exterior layer of the chamber. Each of the polymeric films may include a single-layer film or a multi-layer laminate. In some examples, the bladders are formed by joining the polymeric films to each other to form the chamber and then applying the coloring substance to the chamber. The chamber is then subjected to a laser beam to form the grooves in the exterior surface of the chamber. Operating parameters of the laser may be adjusted to select depths of the grooves in the exterior surface of the chamber. For example, the laser may have operating parameters including a power ranging from 36 Watts to 84 Watts and a scanning speed of 3000 mm/s. The depths of the grooves are sufficient to provide contrast between the grooves and the exterior surface of the chamber and to maintain impermeability and integrity of the polymeric films of the chamber.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The details of one or more implementations of the disclosure are set forth in the accompanying drawings and the description below. Other aspects, features, and advantages will be apparent from the description, the drawings, and the claims.

Figure 1B:
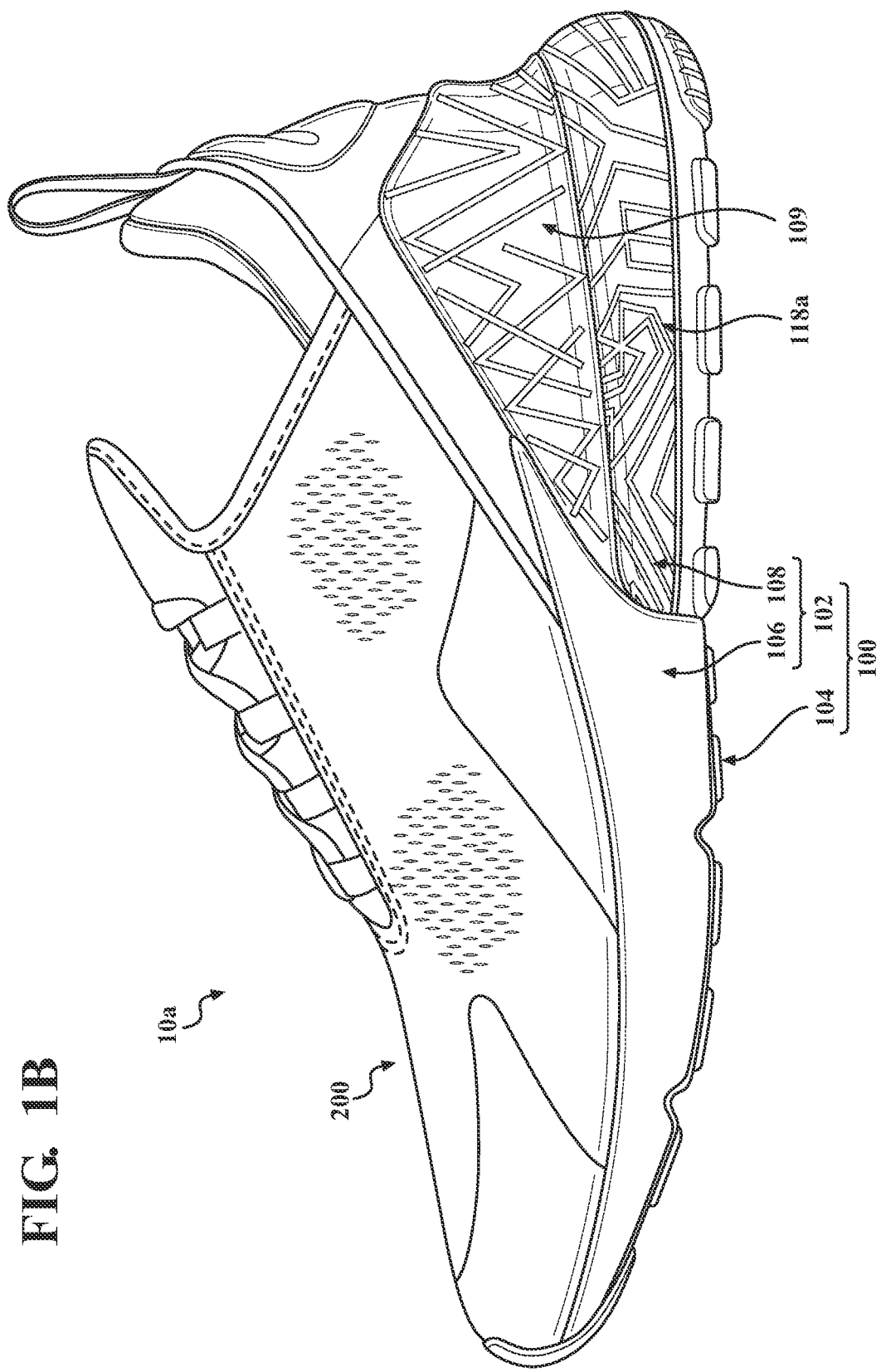
FIG. 1B shows an article of footwear including an example of a sole structure manufactured using a laser etching process in accordance with the principles of the present disclosure.
Figure 1C:
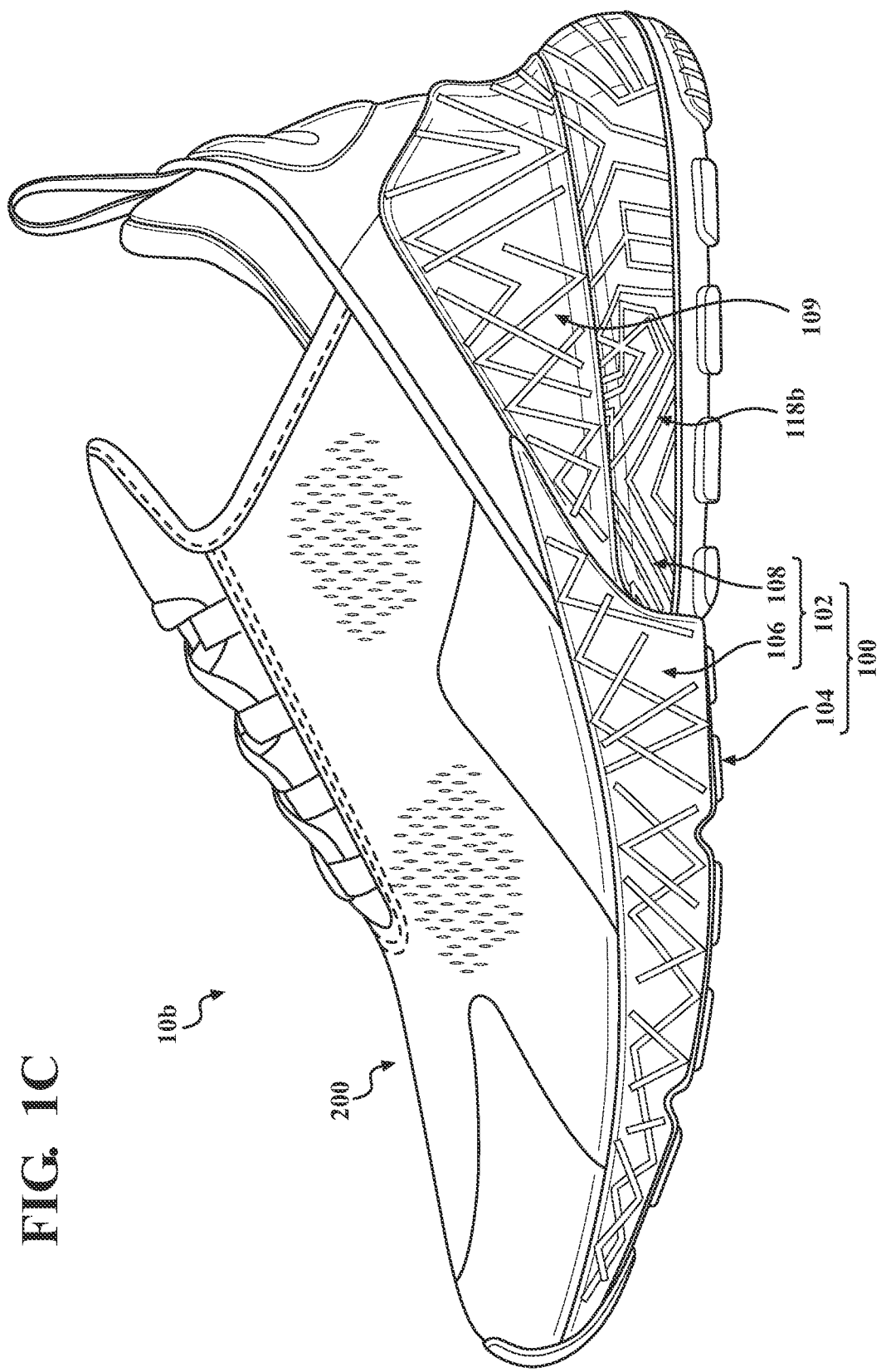
FIG. 1C shows an article of footwear including another example of a sole structure manufactured using a laser etching process in accordance with the principles of the present disclosure.

Referring to FIGS. 1A-1C, examples of an article of footwear 10-10b include a sole structure 100 and an upper 200 attached to the sole structure 100. The sole structure 100 includes a midsole 102 configured to provide cushioning properties and an outsole 104 attached to the midsole 102 to provide a ground-engaging interface of the sole structure 100. As shown, the midsole 102 is constructed as a composite structure including an elastomeric cushioning element 106 in a forefoot region and a bladder 108 disposed in a heel region. Here, the cushioning element 106 defines a first portion of an outer periphery of the sole structure 100 in the forefoot region, while the bladder 108 defines a second portion of the outer periphery of the sole structure 100 in the heel region that is both exposed and visible along the heel region. While FIGS. 1A-1C provide one example of a sole structure 100 including a bladder 108 in the heel region, the principles of the present disclosure can be applied to a bladder at any location of a sole structure—exposed or otherwise. Furthermore, the principles of the present disclosure can be applied to any bladder for use in any portion of an article of footwear or apparel.

In FIG. 1A, the article of footwear 10 is provided with laser-etched pattern 118 formed on an exterior surface of the bladder 108. As discussed below, the laser-etched pattern 118 may be applied to the bladder 108 prior to assembly within the sole structure 100. Alternatively, the laser-etched pattern 118a may be applied to the bladder 108 after assembly within the sole structure 100 or the article of footwear 10. In FIG. 1B, a laser etched-pattern 118a is formed on the bladder 108 and on a polymeric heel counter 109 that extends from the bladder 108 and onto the upper 200 in a heel region. Here, the heel counter 109 and the bladder 108 may include substantially similar materials that can be subjected to the same laser-etching process to apply a continuous laser-etched pattern 118a over the bladder 108 and the heel counter 109. FIG. 1C provides another example of an article of footwear 10b where a laser-etched pattern 118b is applied to the midsole 106, the bladder 108 and, optionally, the heel counter 109. Here, the midsole 106 may include different materials than the bladder 108 such that parameters of the laser-etching process are adjusted between the midsole 106 and the bladder 108. Example processes for laser-etching the sole structure 200 are provided below with respect to FIGS. 14 and 15.

Figure 2A:
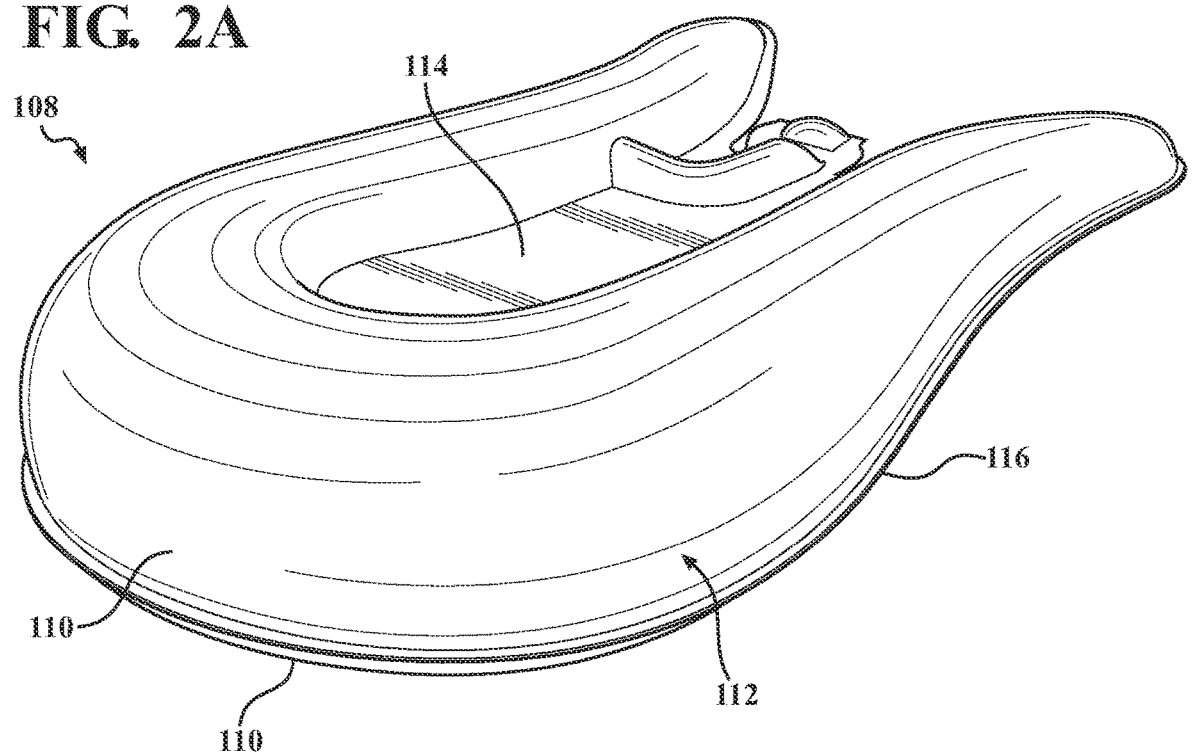
FIG. 2A shows the bladder of FIG. 1A prior to the laser etching process.
Figure 2B:
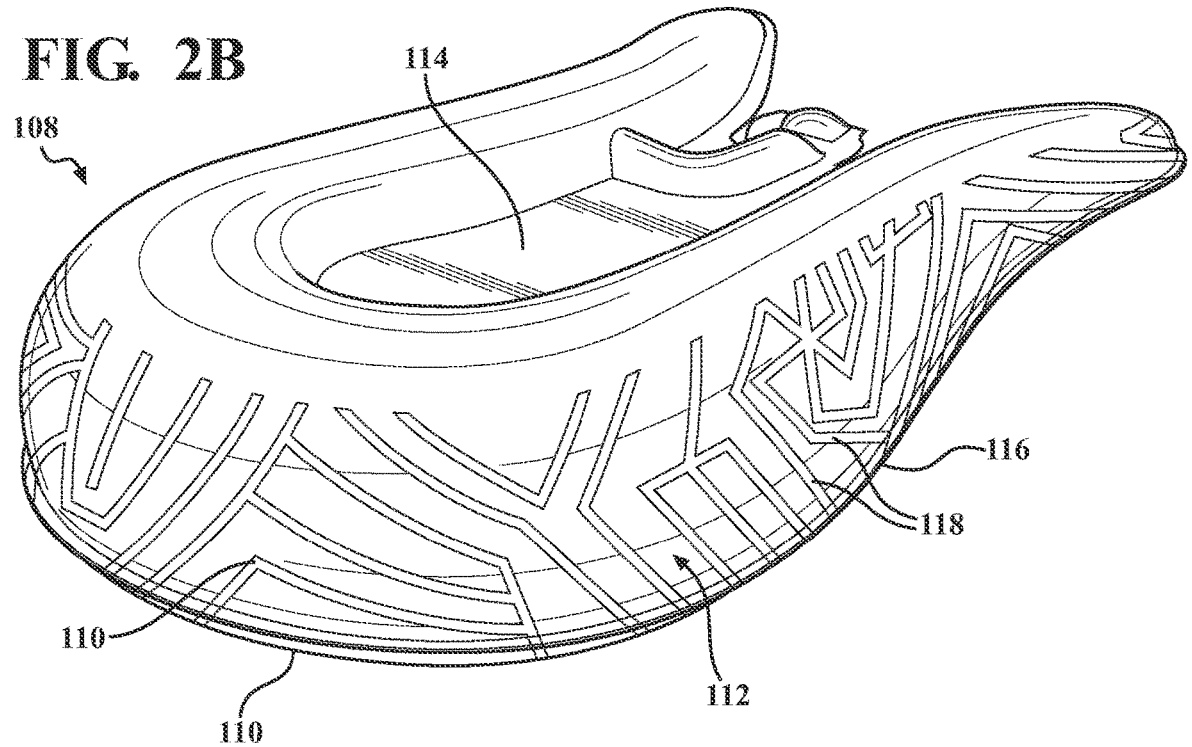
FIG. 2B shows the bladder of FIG. 1A after the laser etching process.

Referring to FIGS. 2A and 2B, the example of the bladder 108 shown in FIG. 1A is shown independent of the sole structure 100. FIG. 2A illustrates the assembled bladder 108 prior to subjecting the bladder 108 to the laser etching process of the present disclosure and FIG. 2B shows the bladder 108 including a laser-etched pattern 118 formed on an exterior surface.

In the illustrated example, the bladder 108 of the midsole 102 includes an opposing pair of polymeric films 110, which can be joined to each other at discrete locations to define a chamber 112, a web area 114, and a peripheral seam 116. In the example shown, the polymeric films 110 include a first, upper polymeric film 110 and a second, lower polymeric film 110. The bladder 108 can be produced from any suitable combination of one or more polymeric films 110. As described in greater detail below, FIGS. 3A-7B provide enlarged cross-sectional views of different configurations of polymeric films 110 that may be used to form the bladder 108. Here, the exterior surfaces of the polymeric films 110 are etched to form a pattern of etched material, hereinafter referred to as grooves 118.

As used herein, the term "polymeric film" (e.g., polymeric films 110) encompasses both single-layer and multi-layer films. In some embodiments, one or both of polymeric films 110 are each produced (e.g., thermoformed or blow molded) from a single-layer film. In other embodiments, one or both of the polymeric films 110 are each produced (e.g., thermoformed or blow molded) from a multi-layer film. In either aspect, each layer or sublayer can have a film thickness ranging from about 0.2 micrometers to about 1 millimeter. In further embodiments, the film thickness for each layer or sublayer can range from about 0.5 micrometers to about 500 micrometers. In yet further embodiments, the film thickness for each layer or sublayer can range from about 1 micrometer to about 100 micrometers.

One or both of the polymeric films 110 can independently be transparent, translucent, and/or opaque. As used herein, the term "transparent" for a polymeric film and/or a fluid-filled chamber means that light passes through the polymeric film in substantially straight lines and a viewer can see through the polymeric film. In comparison, for an opaque polymeric film, light does not pass through the polymeric film and one cannot see clearly through the polymeric film at all. A translucent polymeric film falls between a transparent polymeric film and an opaque polymeric film, in that light passes through a translucent layer but some of the light is scattered so that a viewer cannot see clearly through the layer.

The polymeric films 110 can each comprise a polymeric material that includes one or more polymers. The one or more polymers can include, thermoplastic polymers, one or more thermosetting polymers, one or more thermoset polymers, or any combination thereof. In one aspect, the polymeric material is a thermoplastic material comprising one or more thermoplastic polymers. In other aspects, the polymeric material is a thermoplastic elastomeric material comprising one or more thermoplastic elastomeric polymers. The one or more polymers can include polyesters, polyethers, polyamides, polyolefins, polystyrenes, polyurethanes, or any combination thereof. In an aspect, the polymeric material can include one or more thermoplastic polymers, such as one or more thermoplastic polyurethane (TPU) polymers including one or more thermoplastic elastomeric polyester-polyurethane copolymers. In another aspect, the polymeric material can comprise one or more polymers having a low nitrogen gas transmission rate, such as one or more ethylene-vinyl alcohol (EVOH) copolymers, and the like.

As used herein, "polyurethane" refers to a polymer (including copolymers and oligomers) that contains a urethane group (—N(C=O)O—). These polyurethanes can contain additional groups such as ester, ether, urea, allophanate, biuret, carbodiimide, oxazolidinyl, isocynaurate, uretdione, carbonate, and the like, in addition to urethane groups. In an aspect, one or more of the polyurethanes can be produced by polymerizing one or more isocyanates with one or more polyols to produce copolymer chains having (—N(C=O)O—) linkages.

Examples of suitable isocyanates for producing the polyurethane polymer include diisocyanates, such as aromatic diisocyanates, aliphatic diisocyanates, and combinations thereof. Examples of suitable aromatic diisocyanates include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, and combinations thereof.

In particular aspects, the polyurethane polymer chains are produced from diisocynates including HMDI, TDI, MDI, H12 aliphatics, and combinations thereof. In an aspect, the thermoplastic TPU can include polyester-based TPU, polyether-based TPU, polycaprolactone-based TPU, polycarbonate-based TPU, polysiloxane-based TPU, or combinations thereof.

In another aspect, the polymeric material can include one or more of the following polymers: EVOH copolymers, poly(vinyl chloride), polyvinylidene polymers and copolymers (e.g., polyvinylidene chloride), polyamides (e.g., amorphous polyamides), amide-based copolymers, acrylonitrile polymers (e.g., acrylonitrile-methyl acrylate copolymers), polyethylene terephthalate, polyether imides, polyacrylic imides, and other polymeric materials known to have relatively low nitrogen gas transmission rates. Blends of these materials as well as with the TPU polymers described herein and optionally including combinations of polyimides and crystalline polymers, are also suitable.

The polymeric films 110 may include two or more layers (i.e., as a multi-layer film). In further embodiments, polymeric films 110 may each independently include alternating layers of a first polymeric material comprising a TPU polymer, including a thermoplastic elastomeric polyester-polyurethane, and a second polymeric material comprising one or more polymers having a low nitrogen gas transmission rate, such as an EVOH copolymer. The total number of alternating layers in each of the polymeric films 110 can include at least four (4) sublayers, at least ten (10) sublayers, at least twenty (20) sublayers, at least forty (40) sublayers, and/or at least sixty (60) sublayers.

The chamber 112 portion of the bladder can be produced from the polymeric films 110 using any suitable technique, such as thermoforming (e.g. vacuum thermoforming), blow molding, extrusion, injection molding, vacuum molding, rotary molding, transfer molding, pressure forming, heat sealing, casting, low-pressure casting, spin casting, reaction injection molding, radio frequency (RF) welding, and the like. In an aspect, the polymeric films 110 can be produced by co-extrusion followed by vacuum thermoforming to produce an inflatable chamber 112, which can optionally include one or more valves (e.g., one way valves) that allows the chamber 112 to be filled with the compressible material (e.g., gas, elastomeric material, spacer textile).

The chamber 112 can be provided in a fluid-filled state (e.g., as provided in footwear 10) or in an unfilled state. The chamber 112 can be filled to include any suitable fluid, such as a gas or liquid. In an aspect, the gas can include air, nitrogen ($N_2$), or any other suitable gas. The fluid provided to the chamber 112 can result in the chamber 112 being pressurized. In some examples, the pressure of the fluid ranges from 5 psi to 35 psi, and more particularly from 20 psi to 35 psi, and more particularly from 25 psi to 35 psi. Alternatively, the fluid provided to the chamber 112 can be at atmospheric pressure such that the chamber 112 is not pressurized but, rather, simply contains a volume of fluid at atmospheric pressure. In other aspects, the chamber 112 can alternatively include other media, such as pellets, beads, ground recycled material, and the like (e.g., foamed beads and/or rubber beads).

Figure 5A:
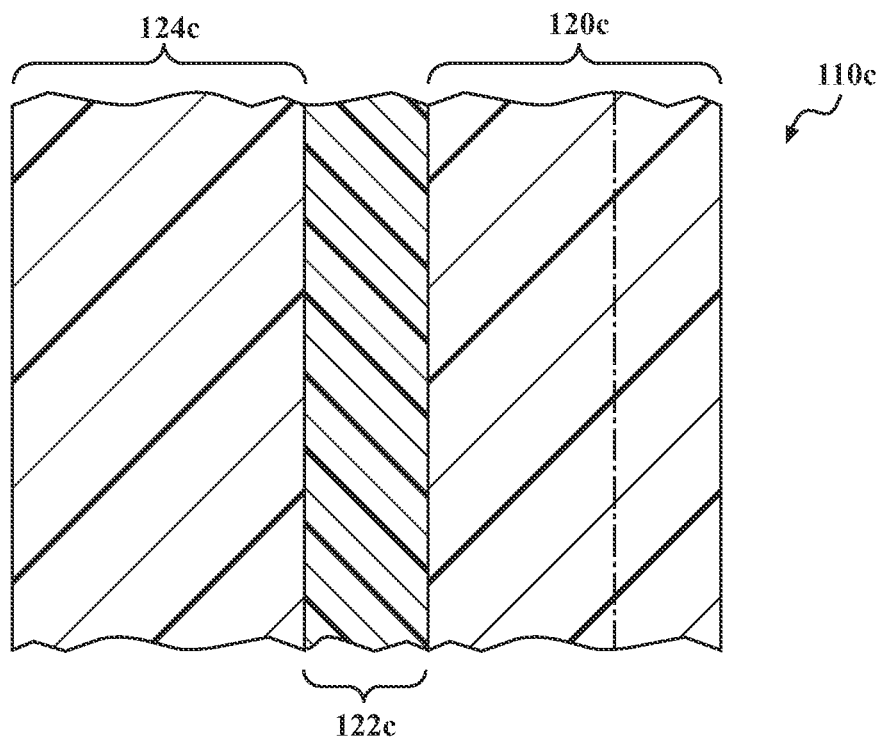
FIG. 5A shows an enlarged, fragmentary cross-sectional view of another example of a configuration of a polymeric film of a bladder prior to the laser etching process.
Figure 5B:
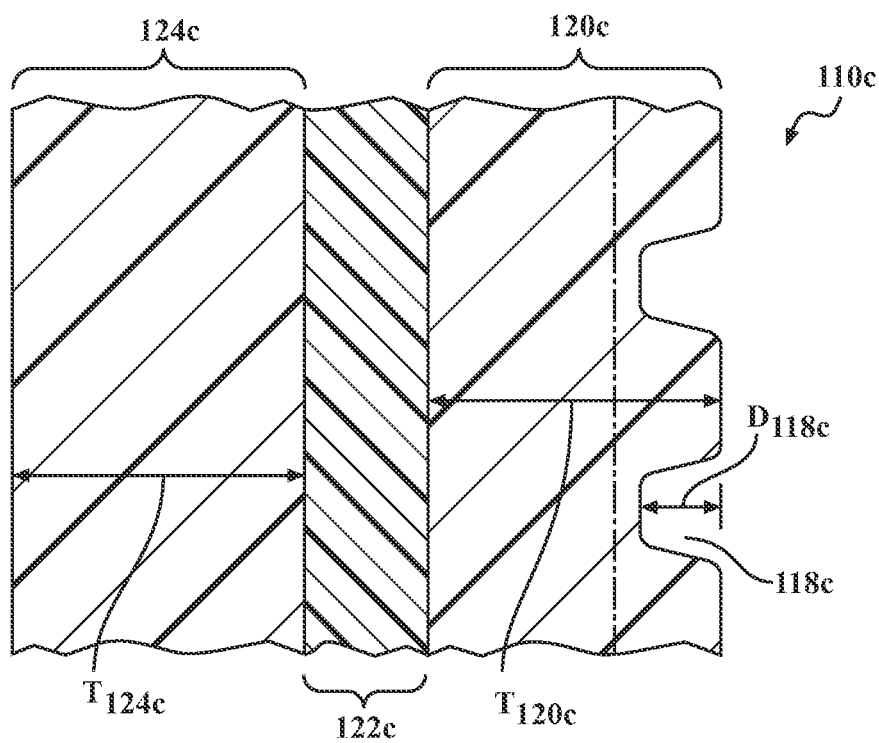
FIG. 5B shows an enlarged, fragmentary cross-sectional view of the polymeric film of FIG. 5A after the laser etching process.
Figure 6A:
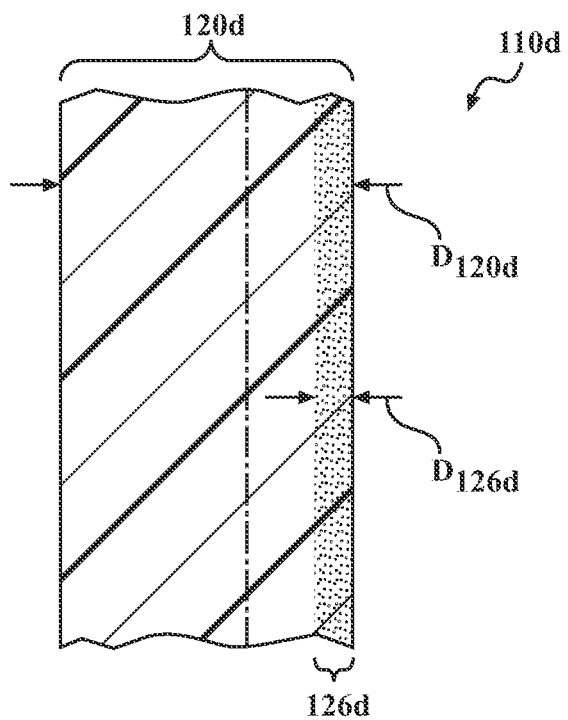
FIG. 6A shows an enlarged, fragmentary cross-sectional view of yet another example of a configuration of a polymeric film of a bladder prior to the laser etching process.
Figure 6B:
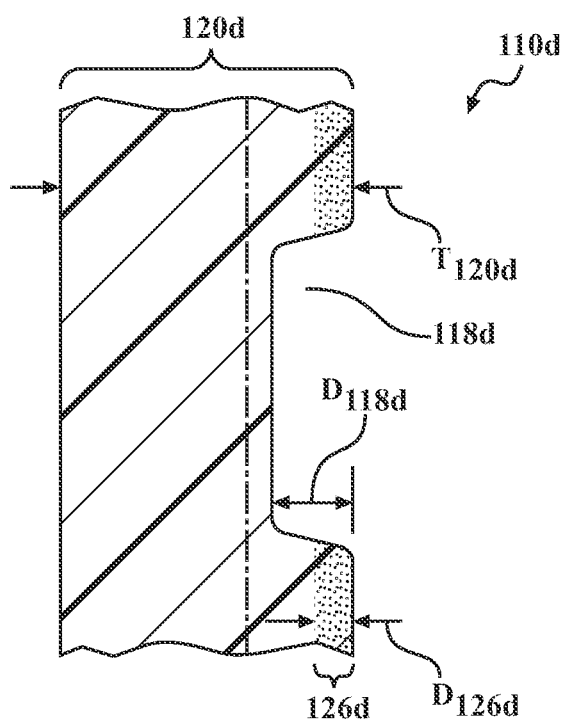
FIG. 6B shows an enlarged, fragmentary cross-sectional view of the polymeric film of FIG. 6A after the laser etching process.
Figure 7A:
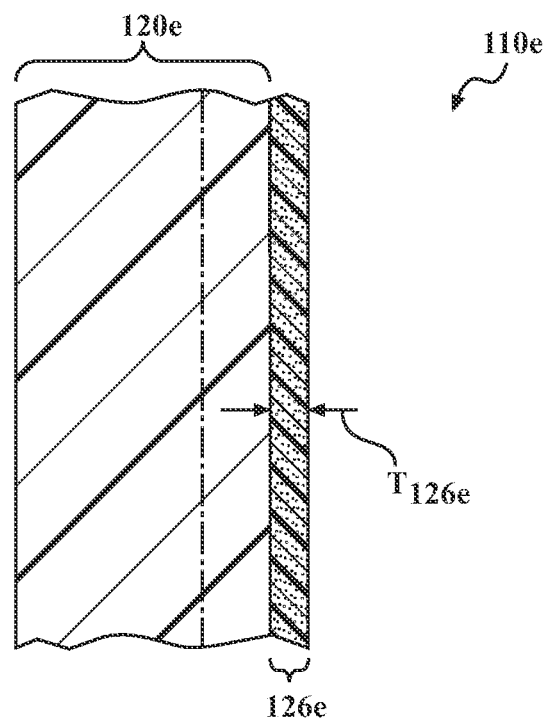
FIG. 7A shows an enlarged, fragmentary cross-sectional view of an alternative example of a configuration of a polymeric film of a bladder prior to the laser etching process.
Figure 7B:
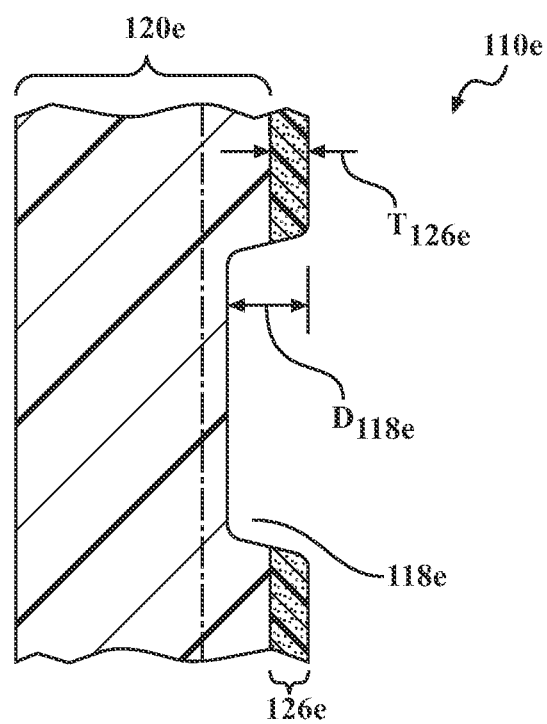
FIG. 7B shows an enlarged, fragmentary cross-sectional view of the polymeric film of FIG. 7A after the laser etching process.

FIGS. 3A-7B provide non-limiting examples of polymeric film configurations 110a-110e suitable for laser etching according to the present disclosure. FIGS. 3A-5B show examples of polymeric films 110a-110d formed according to the foregoing methods, including a single-layer film 110a, 110d and multi-layer films 110b, 110c, 100e. Optionally, an exterior surface of the polymeric films 110d, 110e may be colored using a dye (FIGS. 6A and 6B) or coating (FIGS. 7A and 7B). As used herein, dye refers to a coloring substance that chemically bonds to the material of the polymeric film 110. Thus, the dye may impregnate the exterior surface of the barrier material to change the color of the barrier material without forming additional layers or increasing a thickness of the polymeric film 110d. Conversely, a coating refers to a pigment-based substance that is applied to the exterior surface of the polymeric film 110e and forms an additional layer covering the exterior surface of the polymeric film 110e.

Figure 3A:
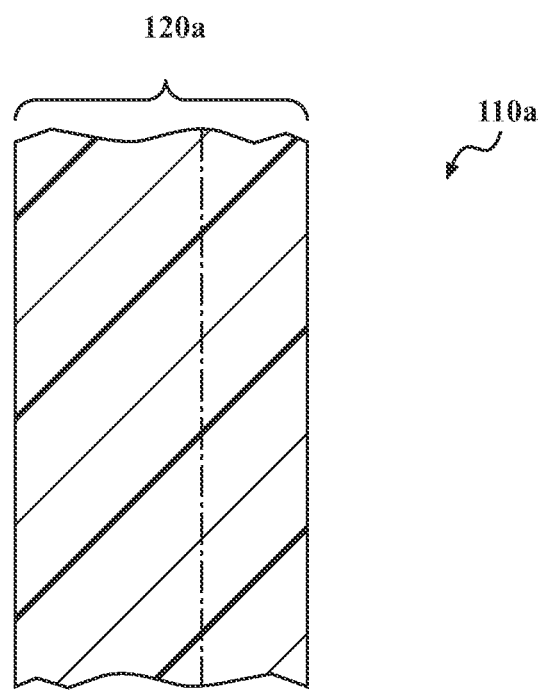
FIG. 3A shows an enlarged, fragmentary cross-sectional view of one example of a configuration of a polymeric film of a bladder prior to the laser etching process.
Figure 3B:
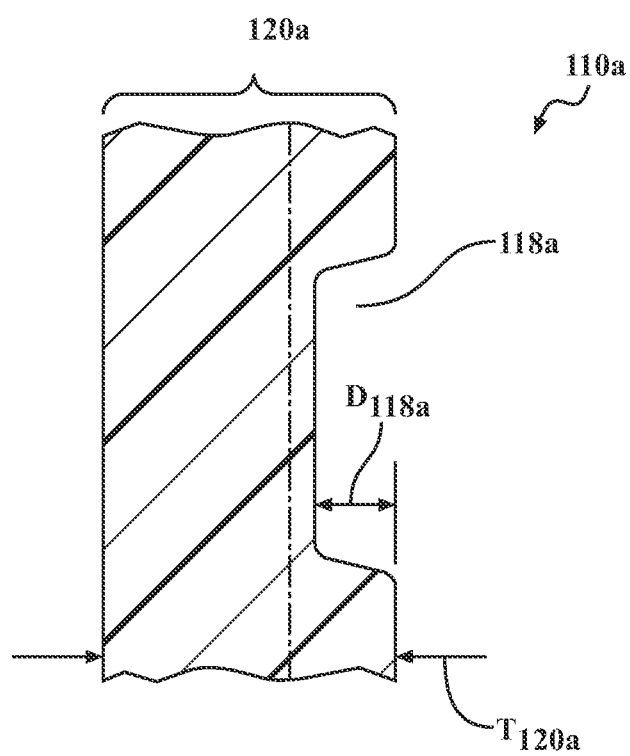
FIG. 3B shows an enlarged, fragmentary cross-sectional view of the polymeric film of FIG. 3A after the laser etching process.

With reference to FIGS. 3A and 3B, a first example of a polymeric film 110a includes a single film layer 120a having a thickness $T_{120a}$ ranging from 0.5 mm to 1.5 mm. FIG. 3A shows the polymeric film 110a prior to the laser etching process and FIG. 3B shows the polymeric film 110a including grooves 118a formed in the exterior surface using the laser etching process. In this example, a groove depth $D_{118a}$ ranges from 5% to 35% of the entire thickness $T_{120a}$ (i.e., from an exterior surface to an interior surface) of the film layer 120a. As provided below, the groove depth $D_{118a}$ is selected by adjusting one or more operating parameters of the laser, including power, frequency, scanning speed, hatch distance, focal length, wavelength, etc. Further, while elements 118a will hereinafter be described as being grooves, these elements 118a could include virtually any shape that forms a depression in the polymeric film 110a.

Figure 4A:
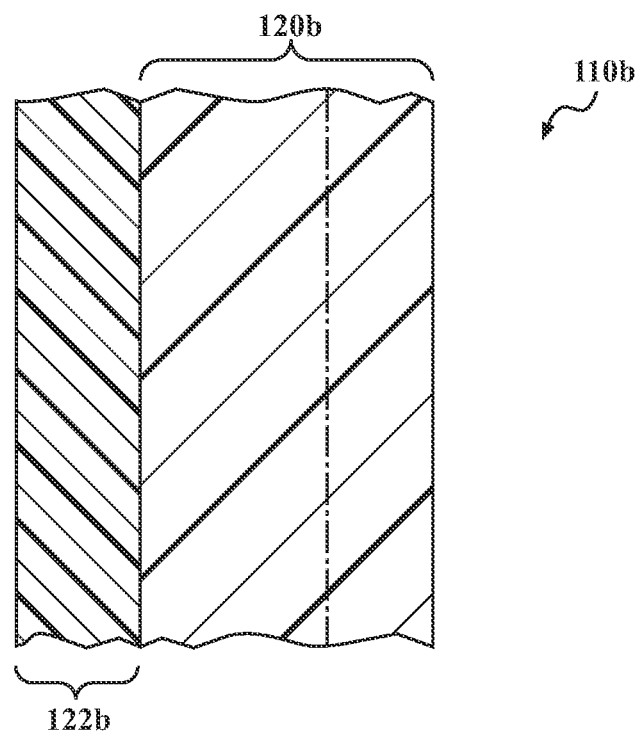
FIG. 4A shows an enlarged, fragmentary cross-sectional view of another example of a configuration of a polymeric film of a bladder prior to the laser etching process.
Figure 4B:
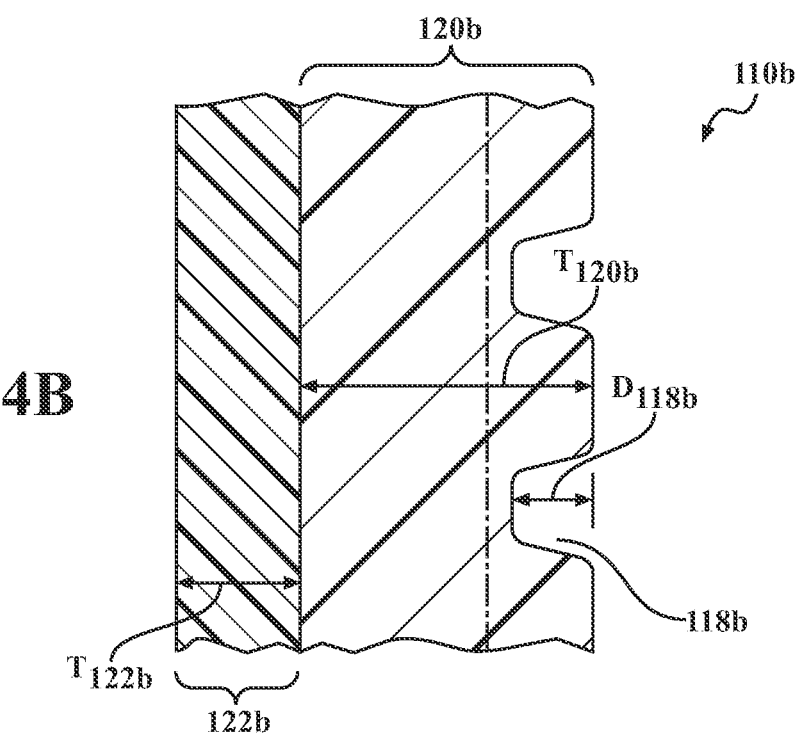
FIG. 4B shows an enlarged, fragmentary cross-sectional view of the polymeric film of FIG. 4A after the laser etching process.

FIGS. 4A and 4B show another example of a polymeric film 110b. Here, the polymeric film 110b includes an exterior cap layer 120b including a first material having a first thickness $T_{120b}$ and a core layer 122b including a second material having a second thickness $T_{122b}$. The core layer 122b may include a second material having a lower gas permeability and/or greater bonding properties than the first material of the exterior cap layer 120b, while the exterior cap layer 120b includes a material more susceptible to the laser etching process. Here, the exterior cap layer 120b has a greater thickness $T_{120b}$ than the thickness $T_{122b}$ of the core layer 122b. As shown in FIG. 4B, the exterior cap layer 120b is subjected to the laser etching process such that a depth $D_{118b}$ of the groove 118b ranges from 5% to 35% of the entire thickness $T_{120b}$ of the exterior cap layer 120b.

FIGS. 5A and 5B provide another example of a polymeric film 110c. Here, the polymeric film 110c includes an exterior cap layer 120c including a first material having a first thickness $T_{120c}$, a core layer 122c including a second material having a second thickness $T_{122c}$, and an interior cap layer 124c including a third material having a third thickness $T_{124c}$. The core layer 122c may include a material having a lower gas permeability than the exterior cap layer 120c and the interior cap layer 124c, while the exterior cap layer 120c includes a material more susceptible to the laser etching process. The interior cap layer 124c may include the same or different materials than the exterior cap layer 120c. In some examples, the material of the interior cap layer 124c is configured to enhance bonding (i.e., melding, adhesion) between opposing polymeric films 110 for forming the web area 114 and/or peripheral seam 116. Here, the exterior cap layer 120b has a greater thickness $T_{120b}$ than the thickness $T_{122c}$ of the core layer 122c. As shown in FIG. 5B, the exterior cap layer 122c is subjected to the laser etching process such that a depth $D_{118c}$ of the groove 118c ranges from 5% to 35% of the entire thickness $T_{102c}$ of the exterior cap layer 120c.

FIGS. 6A and 6B provide an example of a polymeric film 110d having an exterior surface colored using a dye 126d as a coloring substance. The illustrated example shows the polymeric film 110d including a single film layer 120d material with the dye 126d impregnated a desired depth $D_{126d}$ into the exterior surface of the film layer 120d. In FIG. 6B, a groove 118d is formed in the exterior surface through the thickness $D_{126}$ of the dye 126d. The depth $D_{118d}$ of the groove 118d ranges from 5% to 35% of the entire thickness $T_{110d}$ of the film layer 120d and is greater than the depth $D_{126d}$ of the dye 126d. Thus, the undyed material of the film layer 120d that underlies the dye 126d is exposed in the etched groove 118d to provide contrast between the groove 118d and the dyed exterior surface of the film layer 120d.

FIGS. 7A and 7B provide an example of a polymeric film 110e having an exterior surface colored using a coating 126e as a coloring substance. As discussed above, the coating 126e is distinguishable from the dye 126d, as the coating 126e forms an additional layer covering the exterior surface of the substrate. Here, the substrate is a single film layer 120e with the coating 126e applied to the exterior surface thereof. The coating 126e may be an enamel material having a thickness $T_{126e}$ ranging from 0.01 mm to 0.07 mm, and more particularly from 0.02 mm to 0.6 mm, and even more particularly from 0.035 mm to 0.045 mm. In FIG. 7B, a groove 110e is formed in the exterior surface through the thickness $T_{126e}$ of the coating 126e. The depth Dirge of the groove 118e includes the thickness $T_{126e}$ of the coating plus 5% to 35% of the entire thickness $T_{110c}$ of the film layer 120e. For example, where the film layer 120e has a thickness $T_{120e}$ of 1.0 mm and the coating 126e has a thickness $T_{126e}$ of 0.04 mm, the depth $D_{118e}$ of the groove 118e ranges from 0.09 mm to 0.39 mm. Thus, the undyed material of the polymeric film 100d is exposed in the etched groove 118e to enhance visibility of the groove 118e.

While the dye 126d and the coating 126e of the present example are shown with respect to polymeric films 110d, 110e including single-layer films 120d, 120e, the dye 126d and the coating 126e may be applied to exterior surfaces of any polymeric films 110 configured according to the foregoing examples. For instance, the dye 126d and/or the coating 126e may be applied to exterior surfaces of polymeric films 110 including a plurality of layers including cap layers, core layers, or any combination thereof. Furthermore, while the foregoing examples provide that the grooves 118-118e have depths $D_{118}$-$D_{118e}$ ranging from 5% to 35% of the entire thickness $T_{120}$-$T_{120e}$ of the film or cap layers 120-120e, the depths Dug-Dim of the grooves 118-118e may be constant or variable along a single bladder 108. For example, a single groove 118 may vary in depth from 5% to 35% of the entire thickness $T_{120}$-$T_{120e}$ of the layers 120-120e or may be a constant depth $D_{118}$-$D_{118e}$ along the entire exterior surface of the bladder 108.

Figure 8A:
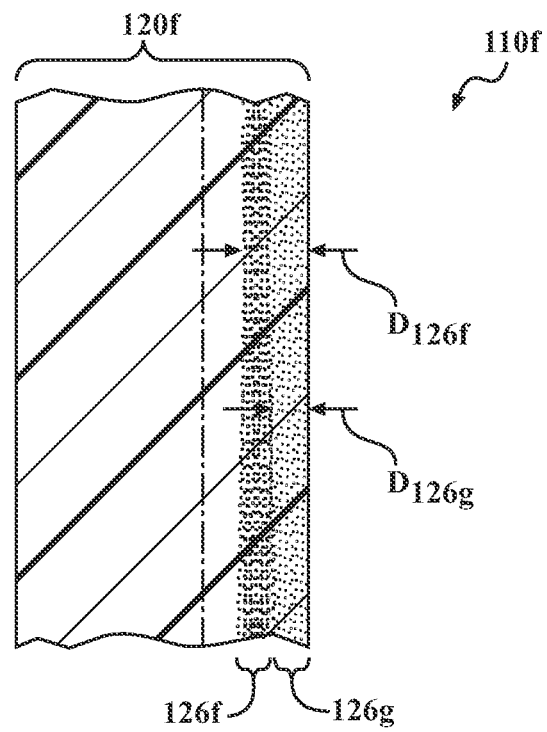
FIG. 8A shows an enlarged, fragmentary cross-sectional view of another example of a configuration of a polymeric film of a bladder prior to the laser etching process.
Figure 8B:
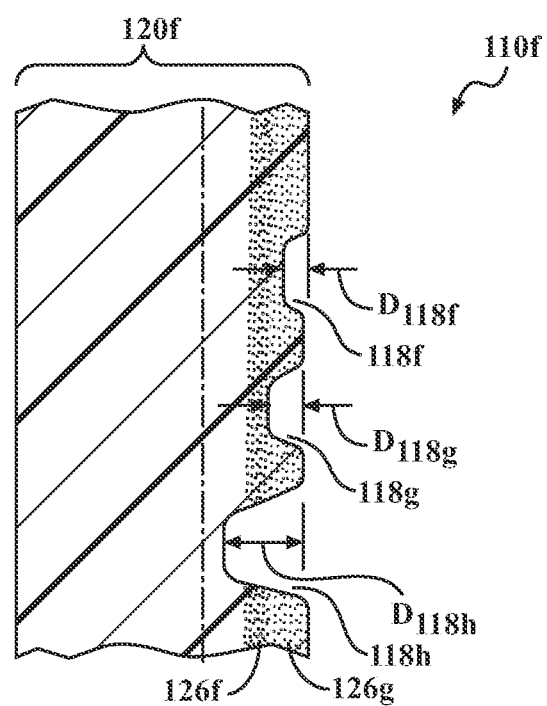
FIG. 8B shows an enlarged, fragmentary cross-sectional view of the polymeric film of FIG. 8A after the laser etching process.

FIGS. 8A and 8B provide an example of a polymeric film 110f having an exterior surface colored using two applications or layers of dyes 126d, 126f as a coloring substance. The illustrated example shows the polymeric film 110f including a single film layer 120f material with a first layer of a first dye 126f impregnated a desired first depth $D_{126f}$ into the exterior surface of the film layer 120f and the second layer of the second dye 126g impregnated a desired second depth $D_{126g}$ into the exterior surface of the film layer 120f. Here, the first depth $D_{126f}$ is greater than the second depth $D_{126g}$ such that the first layer of the first dye 126f extends deeper into the polymeric film 110f than the second layer of the second dye 126g. The first dye 126f and the second dye 126g may be different colors and/or opacities.

In FIG. 8B, examples of grooves 118f-118h are shown as being formed in the exterior surface of the film layer 120f at various depths. As shown, a first example of a groove 118f is formed with a first depth $D_{118f}$ that is less than the depth $D_{126g}$ of the second dye 126g, a second example of a groove 118g is formed with a second depth $D_{118g}$ that is greater than the depth $D_{126f}$ of the second dye 126g and less than the depth $D_{126f}$ of the first dye 126f, and a third example of a groove 118h is formed with a third depth $D_{118h}$ that is greater than the depth $D_{126f}$ of the first dye 126f. Thus, the properties (e.g., color, opacity) of the second dye 126g are exposed in the first groove 118f, the properties of the first dye 118f are exposed in the second groove 118g, and the undyed material of the film layer 120f that underlies the first dye 126f is exposed in the third groove 118h. While the illustrated film 110f illustrates three examples of grooves 118f-118h having different depths, it should be appreciated that this combination is for illustrative purposes and that the polymeric film 110f may be formed with just a single one of the grooves 118f-118h or any combination of the grooves 118f-118h. Thus, different depths of grooves may be combined to provide alternative coloring within the grooves 118f-118h along the exterior surface of the film layer 120. Additionally or alternatively, different opacities of dyes may be used in the first dye layer 126f and the second dye layer 126g such that modifying the depths $D_{118f}$ of the first groove 118h results in different mixtures of the color in the first groove 118f. For example, where the first dye layer 126f is blue and the second dye layer 126g is yellow, the depth $D_{118f}$ of the first groove 118f may be shallower to provide a greener hue (e.g., higher yellow to blue ratio) or deeper to provide a bluer hue (e.g., lower yellow to blue ratio).

Figure 9A:
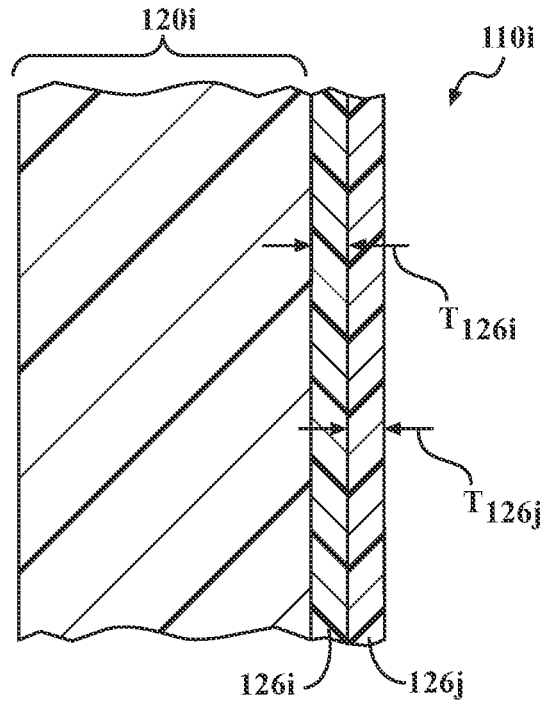
FIG. 9A shows an enlarged, fragmentary cross-sectional view of a further example of a configuration of a polymeric film of a bladder prior to the laser etching process.
Figure 9B:
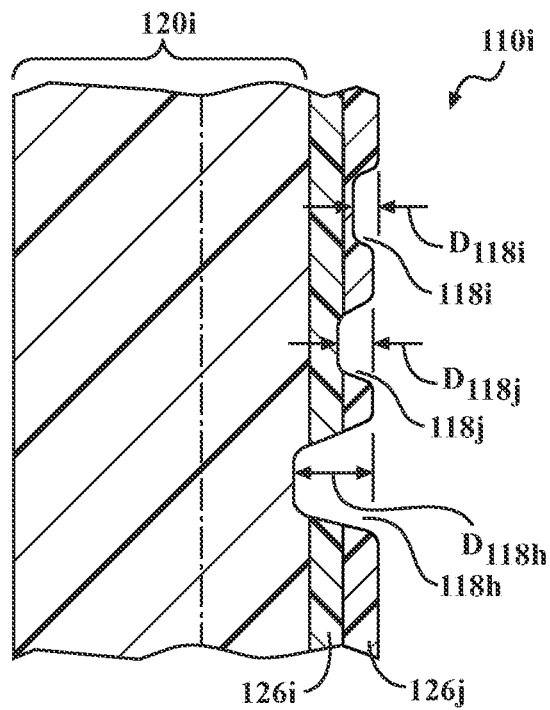
FIG. 9B shows an enlarged, fragmentary cross-sectional view of the polymeric film of FIG. 9A after the laser etching process.

FIGS. 9A and 9B provide an example of a polymeric film 110i having an exterior surface colored using two applications or layers of coatings 126i, 126j as a coloring substance. The illustrated example shows the polymeric film 110i including a single-layer film layer 120i material. Here, the substrate is a single-layer film layer 120i with a first coating 126i applied to the exterior surface thereof. The first coating 126i may be an enamel material having a thickness $T_{126i}$ ranging from 0.01 mm to 0.07 mm, and more particularly from 0.02 mm to 0.6 mm, and even more particularly from 0.035 mm to 0.045 mm. The film 110i further includes a second coating 126j applied to the exterior surface of the first coating 126i. The second coating 126j may be an enamel material having a thickness $T_{126j}$ ranging from 0.01 mm to 0.07 mm, and more particularly from 0.02 mm to 0.6 mm, and even more particularly from 0.035 mm to 0.045 mm. The first coating 126i and the second coating 126j may have different coating properties (e.g., color, opacity).

In FIG. 9B, examples of grooves 118i-118k are shown as being formed in the exterior surface of the film 110i at various depths. As shown, the first example of a groove 118i is formed with a first depth $D_{118i}$ that is less than the depth $D_{126j}$ of the second coating 126j, a second example of a groove 118j with a second depth $D_{118j}$ that is greater than the depth $D_{126j}$ of the second coating 126j and less than the depth $D_{126i}$ of the first coating 126i, and a third example of a groove 118k with a third depth $D_{118k}$ that is greater than the combined depths $D_{126i}$, $D_{126j}$ of the first coating 126i and the second coating 126j. Thus, the properties (e.g., color, opacity) of the second coating 126j are exposed in the first groove 118i, the properties of the first coating 126i are exposed in the second groove 118j, and the undyed material of the film layer 120i that underlies the first coating 126i is exposed in the third groove 118h. While the illustrated film 110i illustrates three examples of grooves 118i-118k having different depths, it should be appreciated that this combination is for illustrative purposes and that the polymeric film 110i may be formed with just a single one of the grooves 118i-118k or any combination of the grooves 118i-118k. Thus, different depths of grooves may be combined to provide alternative coloring within the grooves 118i-118k along the exterior surface of the film layer 120. Additionally or alternatively, different opacities of coatings may be used in the first coating 126i and the second coating 126j such that modifying the depths $D_{118i}$ of the first groove 118i results in different mixtures of the color in the first groove 118i. For example, where the first dye coating 126i is blue and the second coating 126j is yellow, the depth $D_{118i}$ of the first groove 118i may be shallower to provide a greener hue (e.g., higher yellow to blue ratio) or deeper to provide a bluer hue (e.g., lower yellow to blue ratio).

Figure 10A:
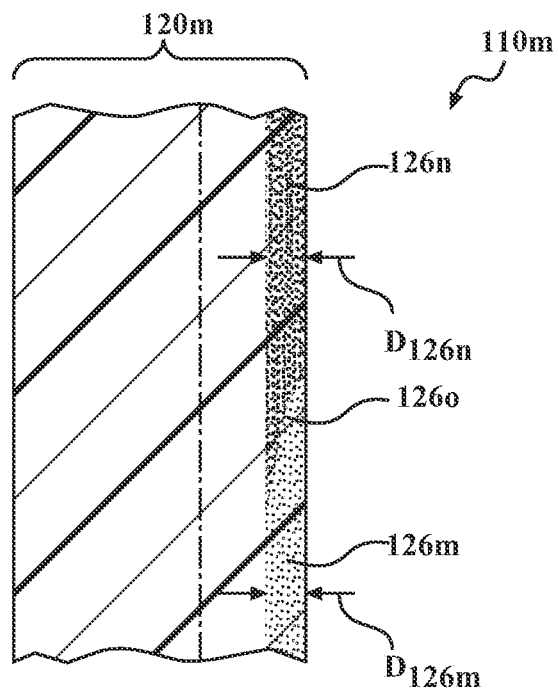
FIG. 10A shows an enlarged, fragmentary cross-sectional view of an alternative example of a configuration of a polymeric film of a bladder prior to the laser etching process.
Figure 10B:
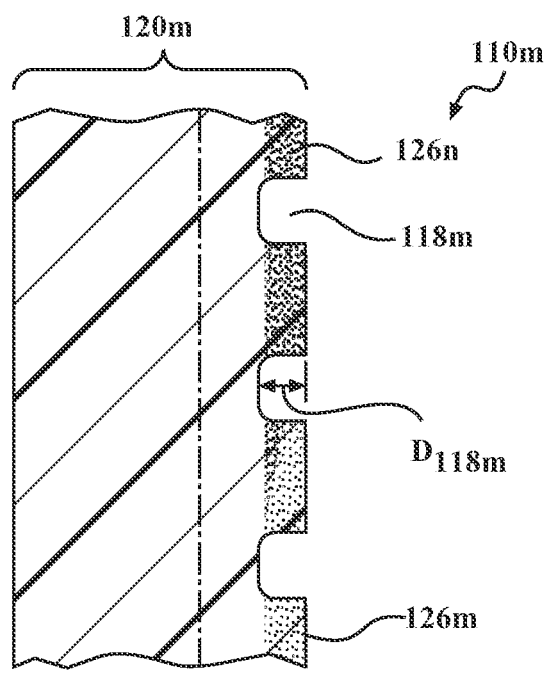
FIG. 10B shows an enlarged, fragmentary cross-sectional view of the polymeric film of FIG. 10A after the laser etching process.

FIGS. 10A and 10B provide an example of a polymeric film 110m having an exterior surface colored using two applications or layers of dyes 126m, 126n as a coloring substance. The illustrated example shows the polymeric film 110m including a single film layer 120m material with a first layer of a first dye 126m impregnated a desired first depth $D_{126m}$ into the exterior surface of the film layer 120m and the second layer of the second dye 126n impregnated a desired second depth $D_{126n}$ into the exterior surface of the film layer 120m. Here, the layers of the dyes 126m, 126n are formed adjacent to each other, whereby a boundary between the two layers of the dyes 126m, 126n defines a gradient or transition region 126o where the two layers of the dyes 126m, 126n overlap. As shown, in the transition region 126o, the depths $D_{126m}$, $D_{126n}$ of each of the dye layers 126m, 126n taper along the direction towards the other dye layer 126m, 126n. Thus, the transition region 126o provides a gradual transition from a first property (e.g., color, opacity) of the first dye layer 126m to a second property (e.g., color, opacity) of the second dye layer 126n.

In FIG. 10B, a plurality of grooves 118m is formed in the exterior surface through the depths $D_{126m}$, $D_{126n}$ of the dye layers 126m, 126n and the transition region 126o. The depth $D_{118m}$ of the grooves 118m ranges from 5% to 35% of the entire thickness of the film 110m and is greater than the depths $D_{126m}$, $D_{126n}$ of the dye layers 126m, 126n. Thus, the undyed material of the film layer 120m that underlies the dye layers 126m, 126n and the transition region 126o is exposed in the etched groove 118m to provide contrast between the groove 118m and the dyed exterior surface of the film layer 120m. While this example is provided with two layers of dye 126m, 126n, the film 110m may also be formed including two adjacent layers of a coating that overlap at a transition region.

Figure 11A:
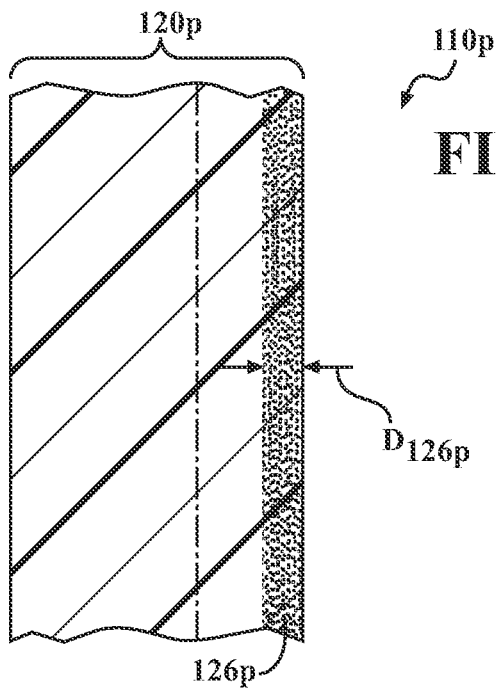
FIG. 11A shows an enlarged, fragmentary cross-sectional view of another example of a configuration of a polymeric film of a bladder prior to the laser etching process.
Figure 11B:
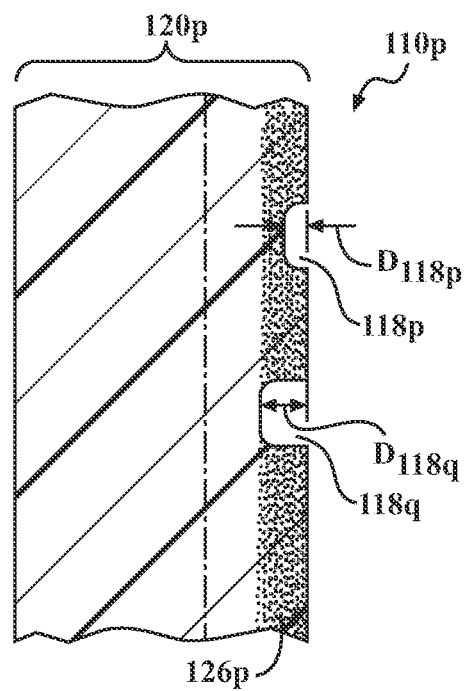
FIG. 11B shows an enlarged, fragmentary cross-sectional view of the polymeric film of FIG. 11A after the laser etching process.
Figure 11C:
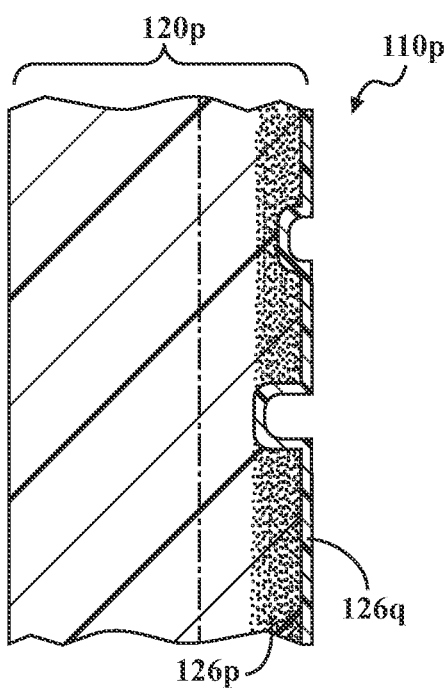
FIG. 11C shows an enlarged, fragmentary cross-sectional view of the polymeric film of FIG. 11A after a secondary coloring process.

FIGS. 11A-11C provide an example of a polymeric film 110p having an exterior surface colored using a combination of a dye layer 126p applied before forming grooves 118p, 118q, and a coating layer 126q that is applied to the film 110p after forming the grooves 118p, 118q. The illustrated example shows the polymeric film 110p including a single film layer 120p material with the dye 126p impregnated a desired depth $D_{126p}$ into the exterior surface of the film layer 120p. In FIG. 11B, a pair of grooves 118p, 118q are formed in the exterior surface. Here, a first groove 118p is formed with a depth $D_{118p}$ that is less than the depth $D_{126p}$ of the dye layer 126p and the second groove 118q is formed with a depth $D_{118q}$ extending through the depth $D_{126p}$ of the dye layer 126p. The depths $D_{118p}$, $D_{118q}$ of grooves 118p, 118q range from 5% to 35% of the entire thickness of the film 110p. Thus, the first groove 118p may have the properties (e.g. color, opacity) of the dye layer 126p, while the undyed material of the film layer 120p that underlies the dye layer 126p is exposed in the second groove 118q to provide contrast between the groove 118q and the dyed exterior surface of the film layer 120q.

In FIG. 11C, the coating layer 126q is applied to the exterior surface of the film 110p. Alternatively, a second dye layer may be applied to the exterior surface of the film 110p. As shown, the coating layer 126q is applied over the dye layer 126p on the exterior surface of the film layer 120p and within the first groove 118p, but is applied to the undyed portion of the film layer 120p within the second groove 118q. Accordingly, the second groove 118q may have the properties (e.g., color, opacity) of the coating layer 126q while the first groove 118p and the exterior surface of the film layer 120p have a combination of the dye layer 126p and the coating layer 126q. For example, the colors or opacities of the dye layer 126p and the coating layer 126q may be combined to provide the appearance of a different color (e.g., yellow coating layer added to blue dye layer forms a green appearance).

Figure 12A:
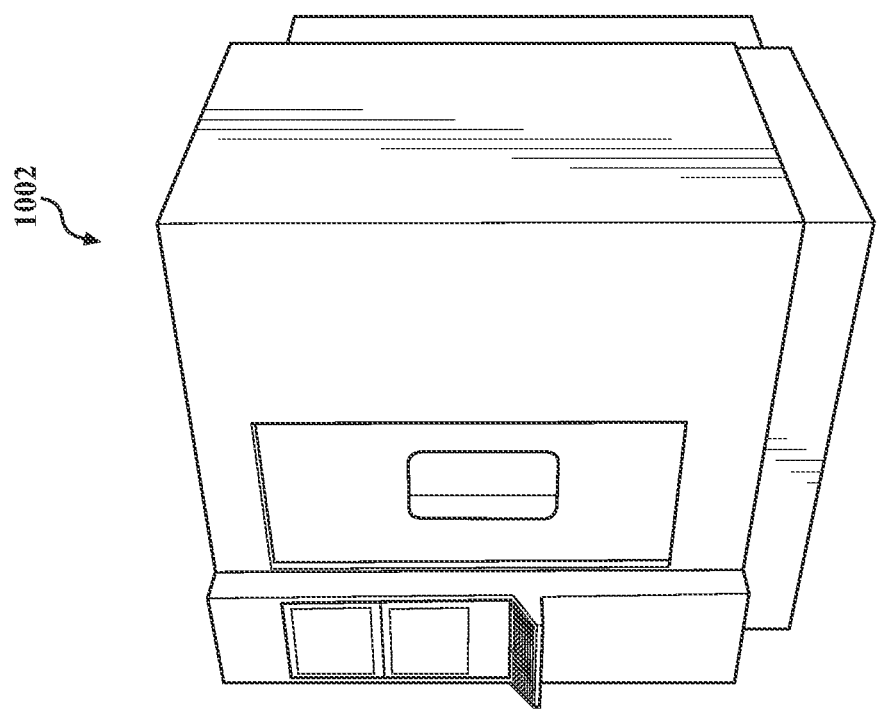
FIG. 12A shows an operation of an example method for laser etching bladders using a system in accordance with the present disclosure.
Figure 12A:
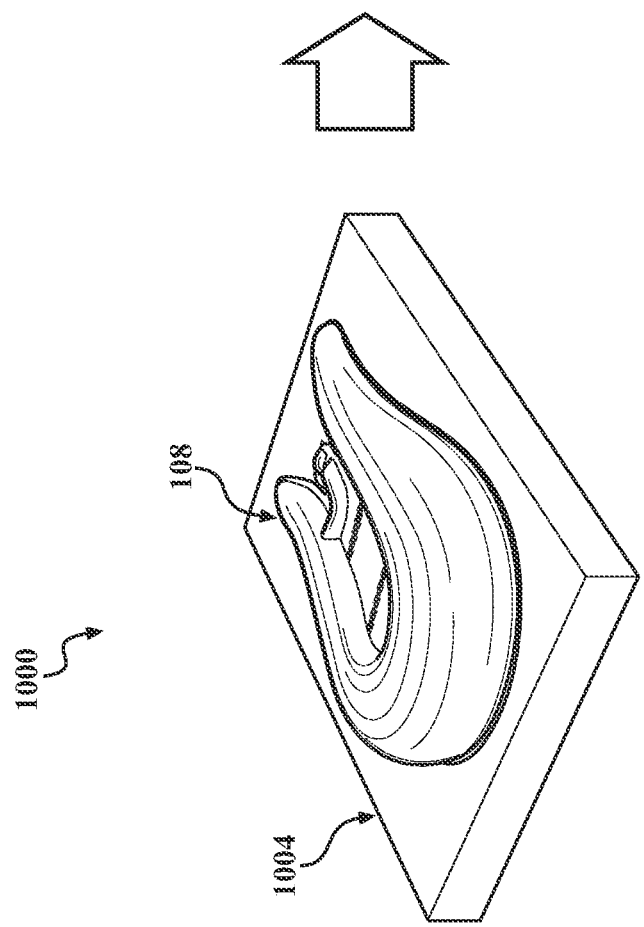
Figure 12B:
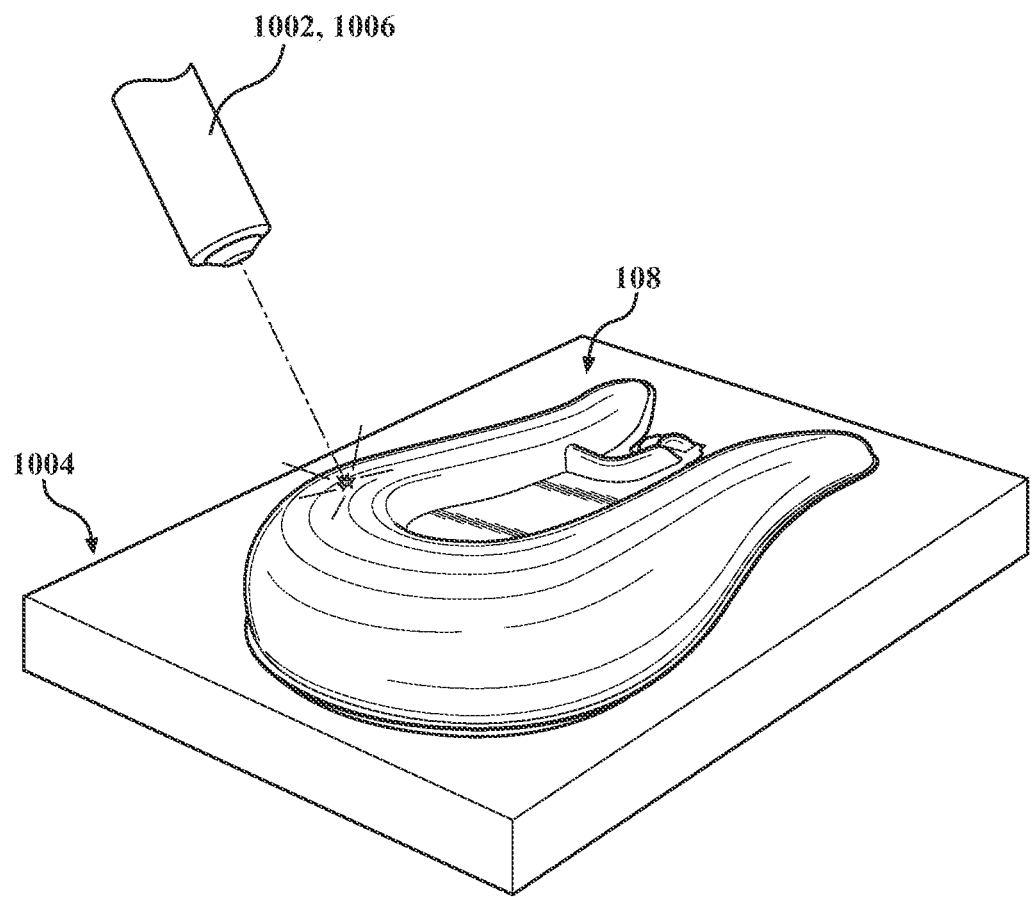
FIG. 12B shows another operation of the method of FIG. 12A.

Referring to FIGS. 12A and 12B, the constructed bladder 108 is provided to a laser-etching system 1000 for forming the laser-etched grooves 118 in in the bladder 108. Here, the laser etching system includes a CNC laser 1002 and a jig or fixture 1004 specifically designed to support the bladder 108 within the laser 1002. In some examples, the system 1000 may be configured as a standalone unit where individual ones of the bladders 108 are loaded and unloaded into a stationary jig or fixture 1004 within the laser 1002. In other examples, the system 1000 may be incorporated as a station within a continuous-feed production environment (e.g., an assembly line), whereby the fixture 1004 is included on a material handling system (e.g., robotic arm, conveyer belt, etc.) configured to continuously transition bladders 108 through the laser 1002. The laser 1002 includes a multi-axis head 1006 configured to move relative to the fixture 1004 within the system 1000.

One example of a suitable laser includes a T2 LSM 300 model laser manufactured by Corron Co., Ltd. However, other CNC lasers may also be configured to carry out the laser etching process of the present disclosure. As discussed above with respect to FIGS. 3A-11C, operating parameters of the laser 1002 are selected to accommodate different thicknesses, materials, and layer configurations of the polymeric films 110 of the bladder 108. Additionally, the operating parameters of the laser 1002 may be selected to provide the grooves 118 of the etching pattern with a desired depth $D_{118}$ from the exterior surface of the polymeric film 110. Operating parameters include laser wave length (μm), laser focal length (mm), laser frequency (KHz), laser scanning speed (mm/s), laser hatch distance (mm), and laser power (Watts)—any one or more of which can be adjusted to select a depth and/or width of the groove 118. Table 1 shows example operating parameters for etching polymeric films 110 according to the present disclosure.

TABLE 1

| Barrier Etching Operating Parameter Values | |
|---|---|
| Operating Parameter | Value |
| Wave Length (μm) | 9-11 μm |
| Focal Length (mm) | 322 mm |
| Frequency (KHz) | 50 KHz |
| Scanning Speed (mm/s) | 3000 mm/s |
| Hatch Distance (mm) | 0.07 mm |
| Power (Watts) | 36-84 W |

The chamber 112 including the etched pattern 118 desirably has a low gas transmission rate to preserve its retained gas pressure. In some configurations, the fluid-filled chamber 112 has a gas transmission rate for nitrogen gas that is at least about ten (10) times lower than a nitrogen gas transmission rate for a butyl rubber layer of substantially the same dimensions. In an aspect, the fluid-filled chamber 112 has a nitrogen gas transmission rate of 15 cubic-centimeter/square-meter·atmosphere·day ($cm^3/m^2$·atm·day) or less for an average film thickness of 500 micrometers (based on thicknesses of the polymeric films 110). In further aspects, the transmission rate is 10 $cm^3/m^2$·atm·day or less, 5 $cm^3/m^2$·atm·day or less, or 1 $cm^3/m^2$·atm·day or less. Accordingly, the depths $D_{118}$-$D_{118e}$ of the grooves 118-118e range from 5% to 35% of the entire thickness $T_{120}$-$T_{120e}$ of the film layer 120-120e to maintain impermeability and integrity of the polymeric films 110.

Figure 13:
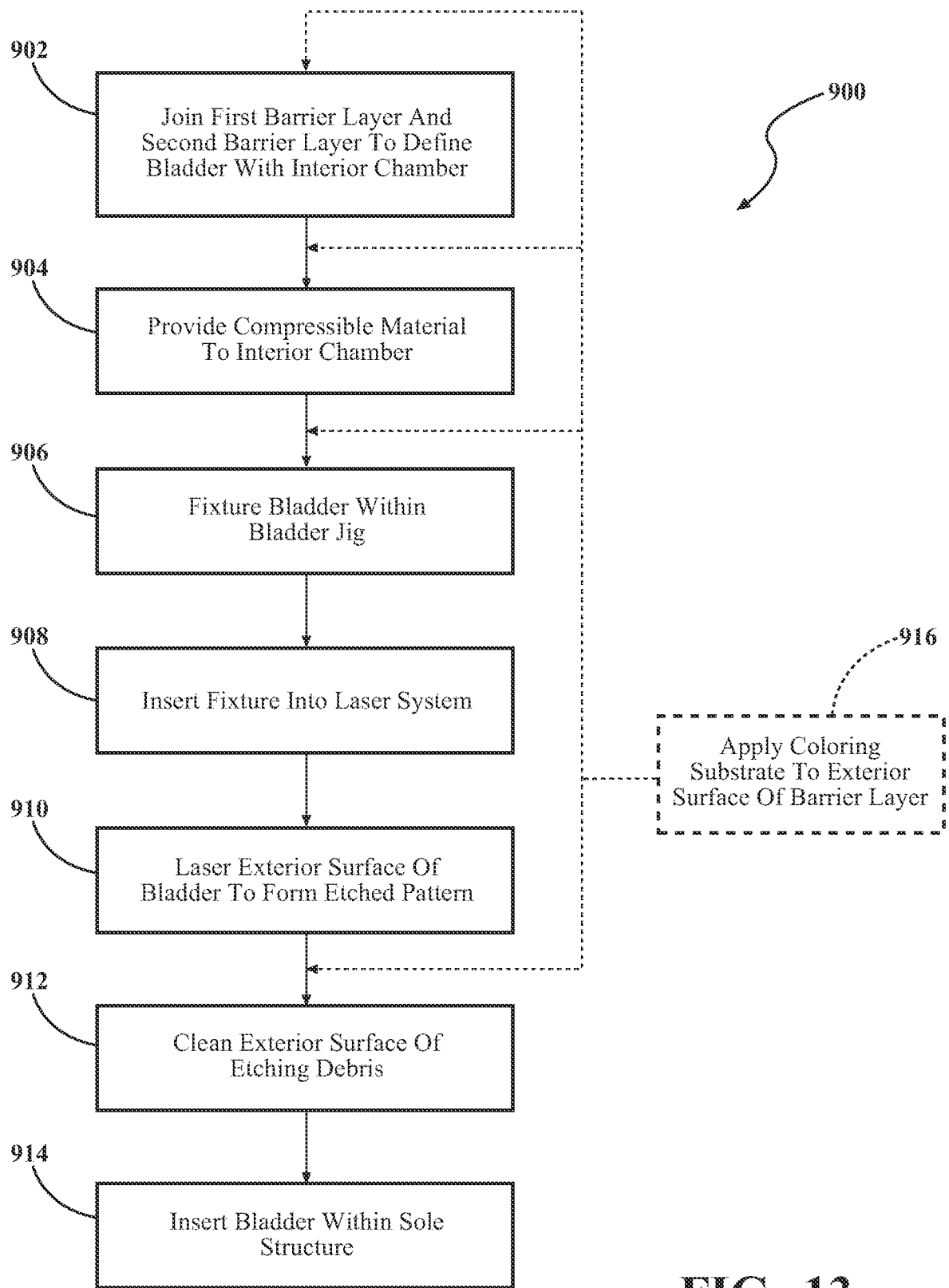
FIG. 13 shows a flowchart of an example method for laser etching bladders in accordance with the present disclosure.

FIG. 13 is a flowchart of an example arrangement of operations for a method 900 for laser etching a bladder 108. The method 900 includes, at operation 902, joining a first polymeric film 110 and a second polymeric film 110 together to define a bladder 108 having an interior chamber 112. At operation 904, the method 900 includes providing a compressible material to the interior chamber 112 of the bladder 112. Here, the compressible material may be a gas having a pressure ranging from 0 psi to 35 psi when the bladder 108 is in an uncompressed (i.e., resting) state. Once the bladder 108 is formed and pressurized, the bladder 108 is fixtured within the lasering jig 1004 at operation 906. At operation 908, the bladder 108 and lasering jig 1004 are inserted into the lasering system 1002. Here, the exterior surface of the bladder 108 is etched by subjecting the exterior surface to the laser. The operating parameters of the laser 1002 are set according to Table 1, above. At operation 912, the bladder 108 is removed from the laser 1002 and the exterior surface of the bladder 108 is cleaned to remove etching debris, such as barrier material remnants and byproducts of the etching process. Once cleaned, the bladder 108 is incorporated within a sole structure 100 of an article of footwear 10, as shown in FIG. 1A.

Optionally, at operation 916, the method 900 includes applying a coloring substance 126d, 126e to an exterior surface of the polymeric films 110 of the bladder 108. As signified by the dashed connector lines, operation 916 may be completed after one or more of operations of the etching process 900. For example, the polymeric films 110 may be colored prior to joining the polymeric films 110 at operation 902. Alternatively, the bladder 108 may be colored before or after the compressible material is provided to the interior chamber 112 at operation 904. In these examples, the bladder 108 is colored prior to the lasering operation 910 such that the coloring substance 126d, 126e is removed to expose the underlying film layer 120-120e. In other examples, the bladder 108 may be colored after the lasering operation 910 such that the coloring substance 126d, 126e is applied within the grooves 118 formed in the polymeric films 110. Here, the grooves 118 provide an etched texture to the polymeric films 110, but have the same color or shading as the non-etched areas of the polymeric films 110.

In each of the foregoing examples, the grooves 118 provide the bladder 108 with a desired shape and appearance. Namely, the grooves 118 provide the bladder 108 with a textured surface and may additionally provide the bladder 108 with a unique appearance by (i) removing a colorant in the areas of the grooves 118 or (ii) providing dimension to the colorant at the grooves 118. In addition, when incorporating the bladder 108 into the sole structure 100 of the article of footwear 10, the grooves 118 may facilitate retention of the bladder 108 within the midsole 102 by allowing a material of the midsole 102 to extend into the grooves 118. Namely, by allowing a material of the midsole 102 to enter the grooves 118 of the bladder 108, a mechanical attachment between the bladder 108 and the midsole 102 is achieved. Further, the grooves 118 effectively increase the overall surface area of the outer surface of the bladder 108, thereby allowing the material of the midsole 102 to bond with more surface area of the bladder 108 as compared to a bladder 108 that is free from grooves 118.

Referring to FIG. 13, an alternative method of forming the laser-etched pattern 118a on the sole structure 100 of the article of footwear 10a (FIG. 1B) is shown. Here, the bladder 108 is formed according to steps 902 and 904 discussed above. The bladder 108 is then assembled into the sole structure 100 with the midsole 106 and the heel counter 109. The assembled sole structure 100 is then positioned within a fixture or jig 1004a configured to support the sole structure 100 such that at least the bladder 108 and the heel counter 109 are exposed. The jig 1004a and the sole structure 100 are then positioned within the laser system 1002 and the exterior surfaces of the sole structure 100 are laser-etched. In the illustrated example, the laser system 1002 is programed to form a continuous laser-etched pattern 118a on the bladder 108 and the heel counter 109. However, the laser system 1002 may be configured to laser etch any combination of the bladder 108, the midsole 106, and/or the heel counter 109.

Figure 14:
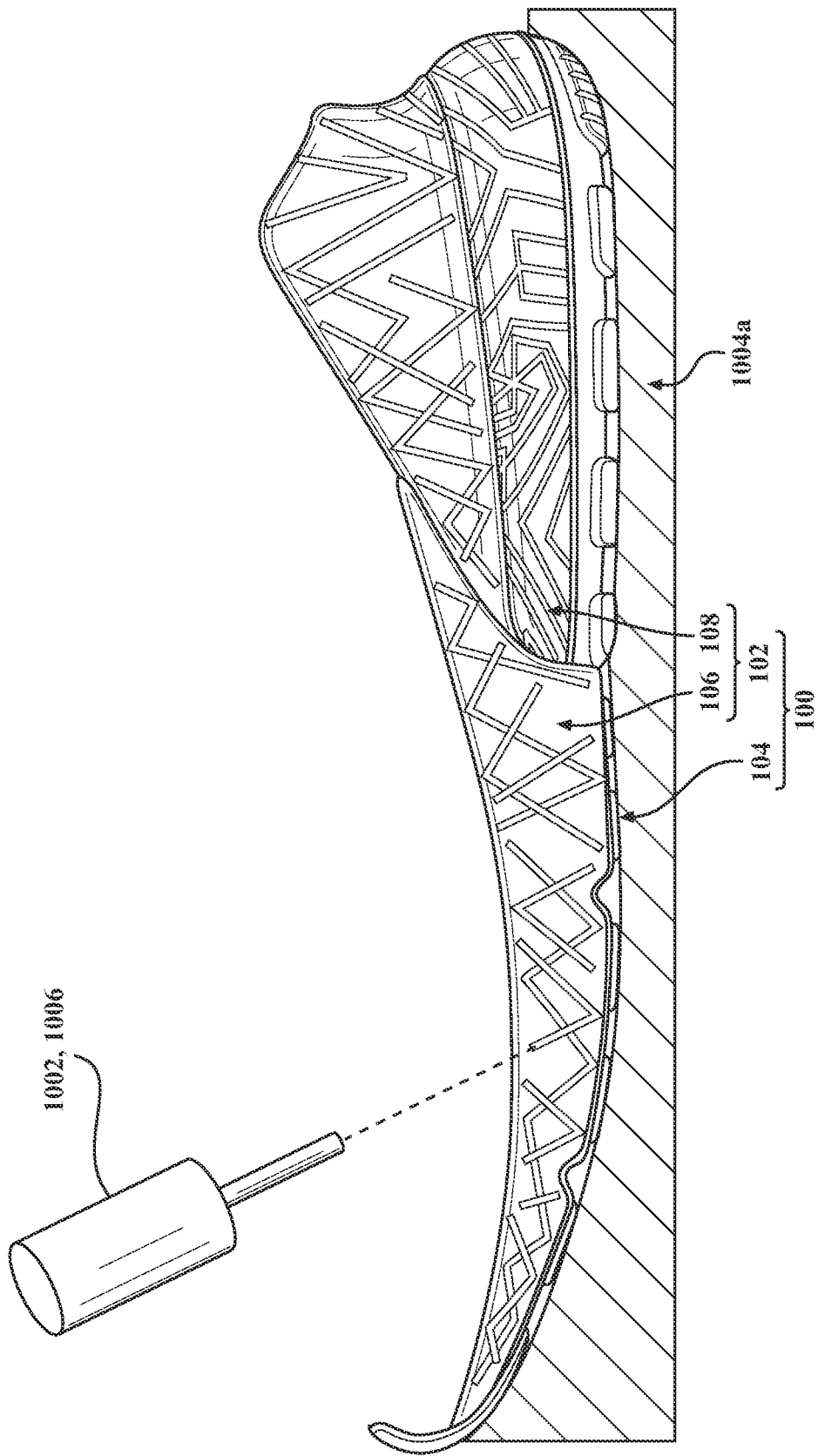
FIG. 14 shows an operation of an example method for laser etching sole structures using a system in accordance with the present disclosure.

Referring to FIG. 14, another method of forming the laser-etched pattern 118b on the sole structure 100 of the article of footwear 10b (FIG. 1C) is shown. Here, the bladder 108 is formed according to steps 902 and 904 discussed above. The bladder 108 is then assembled into the sole structure 100 with the midsole 106 and the heel counter 109. The sole structure 100 is further assembled with the upper 200 to form the article of footwear 10b. The assembled article of footwear 10b is then positioned within a fixture or jig 1004a configured to support the sole structure 100 such that a peripheral portion of the midsole 106, the bladder 108, and the heel counter 109 are exposed. Additionally, the upper 200 of the article of footwear 10b may be covered with a mask 1010 to protect the upper 200 from the laser-etching process. The jig 1004a and the sole article of footwear 10b are then positioned within the laser system 1002 and the exterior surfaces of the sole structure 100 are laser-etched. In the illustrated example, the laser system 1002 is programed to form a laser-etched pattern 118b on the entire periphery of the sole structure 100. However, the laser system 1002 may be configured to laser etch any combination of the bladder 108, the midsole 106, and/or the heel counter 109.

The following Clauses provide an example of a bladder, a sole structure, an article of footwear, and a method for forming a bladder, a sole structure, and an article of footwear described above.

Clause 1. A method comprising providing a bladder comprising one or more polymeric films defining a chamber of the bladder and lasering one or more polymeric films forming at least a portion of an exterior surface of the bladder to form one or more grooves in the exterior surface of the bladder, forming a decorated bladder.

Clause 2. The method of Clause 1, wherein the lasering comprises ablating a polymeric material from the exterior surface of the bladder to form the one or more grooves in the exterior surface of the bladder.

Clause 3. The method of Clause 1 or 2, wherein the lasering comprises lasering one or more polymeric films forming at least a portion of an exterior surface of the chamber of the bladder.

Clause 4. The method of any one of Clauses 1 to 3, further comprising, prior to the lasering, joining the one or more polymeric films to each other to form the chamber of the bladder.

Clause 5. The method of any one of Clauses 1 to 4, further comprising filling the chamber of the bladder with a compressible material.

Clause 6. The method of Clause 5, wherein the filling is conducted after the lasering.

Clause 7. The method of Clause 5 or 6, wherein filling the chamber of the bladder includes filling the chamber with a compressible gas.

Clause 8. The method of Clause 7, wherein filling the chamber of the bladder with a compressible gas includes filling the chamber with the compressible gas to a pressure ranging from 10 psi to 35 psi.

Clause 9. The method of Clause 5, wherein filling the chamber of the bladder with the compressible material includes using an elastomeric material to at least partially fill the chamber.

Clause 10. The method of any of Clauses 1-9, further comprising applying a coloring substance to at least one of the one or more polymeric films.

Clause 11. The method of Clause 10, wherein the applying is conducted prior to the lasering.

Clause 12. The method of Clause 10, wherein applying a coloring substance comprises applying the coloring substance to the one or more polymeric films of the exterior surface of the bladder prior to the lasering.

Clause 13. The method of Clause 10, wherein the lasering includes forming the one or more grooves with a depth that is greater than an entire thickness of the coloring substance.

Clause 14. The method of any of Clauses 10-13, wherein applying a coloring substance to the at least one of the one or more polymeric films includes applying a colored coating forming a colored layer on a surface at least one of the one or more polymeric films.

Clause 15. The method of any of Clauses 10-14, wherein applying a coloring substance to at least one of the one or more polymeric films includes impregnating a colored dye within a polymeric material defining an exterior surface of the at least one of the one or more polymeric films, wherein the colored dye impregnates the at least one of the one or more polymeric films to an impregnation depth, optionally wherein the impregnation depth is less than an entire thickness of the at least one of the one or more polymeric films.

Clause 16. The method of any of Clauses 1-15, wherein lasering the exterior surface of the at least one of the polymeric films includes forming a groove having a depth ranging from 5% to 35% of an entire thickness of the one or more polymeric films.

Clause 17. The method of any of Clauses 1-15, further comprising using a single-layer polymeric film as at least one of the one or more polymeric films.

Clause 18. The method of Clause 17, wherein lasering the exterior surface of the at least one of the polymeric films includes forming a groove having a depth ranging from 5% to 35% of an entire thickness of the layer of the single-layer polymeric film.

Clause 19. The method of any of Clauses 1-16, further comprising using a multi-layer polymeric film as at least one of the one or more polymeric films, the multi-layer polymeric film including an exterior cap layer defining the exterior surface of the bladder, the exterior cap layer comprising a first polymeric material; and a core layer comprising a second polymeric material.

Clause 20. The method of Clause 19, wherein the exterior cap layer is adjacent to the core layer.

Clause 21. The method of any of Clauses 1-16, further comprising using a multi-layer polymeric film as at least one of the polymeric films, the multi-layer polymeric film including an exterior cap layer defining the exterior surface of the bladder, the exterior cap layer comprising a first polymeric material; a core layer comprising a second polymeric material; and an interior cap layer comprising a third polymeric material; wherein the core layer is disposed between the exterior cap layer and the interior cap layer.

Clause 22. The method of any one of Clauses 19 to 21, wherein lasering the exterior surface of the at least one of the polymeric films includes forming a groove having a depth ranging from 5% to 100% of an entire thickness of the exterior cap layer of the multi-layer polymeric film.

Clause 23. The method of any one of Clauses 19 to 21, wherein lasering the exterior surface of the at least one of the polymeric films includes forming a groove having a depth ranging from 5% to 75% of an entire thickness of the exterior cap layer of the multi-layer polymeric film.

Clause 24. The method of any one of Clauses 19 to 21, wherein lasering the exterior surface of the at least one of the polymeric films includes forming a groove having a depth ranging from 5% to 50% of an entire thickness of the exterior cap layer of the multi-layer polymeric film.

Clause 25. The method of any one of Clauses 19 to 21, wherein lasering the exterior surface of the at least one of the polymeric films includes forming a groove having a depth ranging from 5% to 35% of an entire thickness of the exterior cap layer of the multi-layer polymeric film.

Clause 26. The method of any of Clauses 1-25, wherein lasering the exterior surface of the at least one of the polymeric films includes operating the laser at a power ranging from 36 Watts to 84 Watts and a scanning speed of 3000 mm/s.

Clause 27. A bladder comprising a first polymeric film, a second polymeric film attached to the first polymeric film to form a chamber of the bladder, and one or more grooves formed in an exterior surface of the bladder.

Clause 28. The bladder of Clause 27, wherein the chamber of the bladder is at least partially filled with a compressible material.

Clause 29. The bladder of Clause 28, wherein the compressible material comprises a compressible gas.

Clause 30. The method of Clause 29, wherein the compressible gas has a pressure ranging from 10 psi to 35 psi.

Clause 31. The bladder of any one of Clauses 28 to 30, wherein the compressible material comprises a spacer textile.

Clause 32. The bladder of any one of Clauses 28 to 31, wherein the compressible material comprises an elastomeric material.

Clause 33. The bladder of any one of Clauses 27 to 32, wherein at least one of first polymeric film and the second polymeric film includes a single-layer film.

Clause 34. The bladder of Clause 33, wherein the one or more grooves has a depth ranging from 5% to 35% of an entire thickness of the single-layer film.

Clause 35. The bladder of any one of Clauses 26 to 32, wherein at least one of first polymeric film and the second polymeric film includes a multi-layer polymeric film comprising an exterior cap layer and a core layer, the one or more grooves being formed in the exterior cap layer.

Clause 36. The bladder of Clause 35, wherein the exterior cap layer is adjacent to the core layer.

Clause 37. The bladder of any one of Clauses 26 to 32, wherein at least one of the first polymeric film and the second polymeric film is a multi-layer polymeric film including an exterior cap layer comprising a first polymeric material, a core layer comprising a second polymeric material, and an interior cap layer comprising a third polymeric material.

Clause 38. The bladder of Clause 37, wherein the core layer is disposed between the interior cap layer and the exterior cap layer, and the one or more grooves is formed in the exterior cap layer.

Clause 39. The bladder of any one of Clauses 35 to 37, wherein the one or more grooves has a depth ranging from 5% to 100%, or from 5% to 75%, or from 5% to 50%, or from 5% to 35% of an entire thickness of the exterior cap layer.

Clause 40. The bladder of any one of Clauses 27 to 38, wherein the one or more grooves has a depth ranging from 5% to 35% of an entire thickness of the multi-layer polymeric film.

Clause 41. The bladder of any of Clauses 27-40, wherein the exterior surface of the chamber includes a coloring substance having a coloring thickness.

Clause 42. The bladder of Clause 41, wherein the coloring substance is a dye layer impregnated within a polymeric material of the first polymeric film or the second polymeric film of the exterior surface of the bladder.

Clause 43. The bladder of Clause 41 or 42, wherein the coloring substance is a pigment applied as a coloring layer covering the exterior surface of the bladder.

Clause 44. The bladder of any of Clauses 41-43, wherein the one or more grooves has a depth that is greater than the coloring thickness of the coloring substance.

Clause 45. The bladder of any one of Clauses 41-44, wherein the coloring substance comprises a colored dye, and the colored dye impregnates polymeric material of the first polymeric film or the second polymeric film or both the first and second polymeric films, and the impregnated polymeric material has an impregnation depth less than an entire thickness of the first polymeric film or less than an entire thickness of the second polymeric film.

Clause 46. A sole structure including a bladder constructed according to any one of Clauses 1-26.

Clause 47. A sole structure including a bladder according to any one of Clauses 27-45.

Clause 48. An article of footwear including a bladder constructed according to any one of Clauses 1-26.

Clause 49. An article of footwear including a bladder according to any one of Clauses 27-45.

Clause 50. A method of manufacturing an article of footwear, comprising affixing a sole structure to an upper for an article of footwear, wherein the sole structure is a sole structure according to Clause 46 or 47.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A bladder comprising:
   a first polymeric film including a first coating;
   a second polymeric film attached to the first polymeric film to form a chamber; and
   one or more depressions formed in an exterior surface of the bladder at one or more locations on at least one of the first polymeric film and the second polymeric film, the one or more depressions including i) a first depression having a first depth greater than a thickness of the first coating and ii) a second depression having a second depth less than the thickness of the first coating.

2. The bladder of claim 1, wherein the chamber of the bladder is at least partially filled with a compressible material.

3. The bladder of claim 2, wherein the compressible material comprises a compressible gas.

4. The bladder of claim 2, wherein the chamber is pressurized.

5. The bladder of claim 1, wherein the one or more depressions has a depth ranging from approximately 5% to 35% of an entire thickness of the at least one of the first polymeric film and the second polymeric film.

6. The bladder of claim 1, further comprising a second coating disposed between the first coating and the first polymeric layer, the first depression extending at least partially into the second coating.

7. The bladder of claim 1, wherein an exterior surface of the chamber includes a colorant having a colorant thickness.

8. The bladder of claim 7, wherein a portion of the colorant is removed at the one or more depressions.

9. The bladder of claim 7, wherein the one or more depressions includes a depth that is greater than the colorant thickness.

10. An article of footwear incorporating the bladder of claim 1.

* * * * *